United States Patent
Mostafa et al.

(10) Patent No.: US 11,113,510 B1
(45) Date of Patent: Sep. 7, 2021

(54) VIRTUAL TEMPLATES FOR FACIAL RECOGNITION

(71) Applicant: Apple Inc., Cupertino, CA (US)

(72) Inventors: Eslam A. Mostafa, Sunnyvale, CA (US); Kelsey Y. Ho, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 16/427,948

(22) Filed: May 31, 2019

Related U.S. Application Data

(60) Provisional application No. 62/679,849, filed on Jun. 3, 2018.

(51) Int. Cl.
*G06K 9/00* (2006.01)
*G06F 21/32* (2013.01)

(52) U.S. Cl.
CPC ......... *G06K 9/00268* (2013.01); *G06F 21/32* (2013.01); *G06K 9/00255* (2013.01)

(58) Field of Classification Search
CPC . G06K 9/00268; G06K 9/00255; G06F 21/32
See application file for complete search history.

(56) References Cited

U.S. PATENT DOCUMENTS

| | | | |
|---|---|---|---|
| 7,406,184 B2 | 7/2008 | Wolff et al. | |
| 10,043,061 B2 | 8/2018 | Lo et al. | |
| 2010/0275258 A1* | 10/2010 | Kamakura | G06K 9/6277 726/19 |
| 2015/0139492 A1* | 5/2015 | Murakami | G06K 9/3241 382/103 |
| 2016/0125223 A1* | 5/2016 | Boshra | G06K 9/6857 382/124 |
| 2017/0154202 A1 | 6/2017 | Gottemukkula et al. | |
| 2019/0050866 A1* | 2/2019 | Wang | G06K 9/00906 |

OTHER PUBLICATIONS

Rattani, Ajita, et al. "Template update methods in adaptive biometric systems: A critical review." International Conference on Biometrics. Springer, Berlin, Heidelberg, 2009. (Year: 2009).*

Tobias Scheidat, Andrey Makrushin and Claus Vielhauer; "Automatic Template Update Strategies for Biometrics;" Otto-von-Guericke University of Magdeburg, Advanced Multimedia and Security Lab, Magdeburg, Germany; Technical report, May 2007; 5 pages.

* cited by examiner

*Primary Examiner* — Sean M Conner
(74) *Attorney, Agent, or Firm* — Kowert, Hood, Munyon, Rankin & Goetzel, P.C.; Gareth M. Sampson

(57) ABSTRACT

When a device is successfully unlock using a facial recognition authentication process, feature vectors generated from images obtained during the facial recognition authentication process may be stored as temporary templates on the device. After a period of time, one of the temporary templates may be selected to be used as a "virtual" template for the device. For example, a median temporary template in the temporary templates may be selected as the virtual template. The performance of the virtual template may then be assessed over time and compared to the performance of templates generated from an enrollment process to determine if and how the virtual template is implemented on the device.

20 Claims, 12 Drawing Sheets

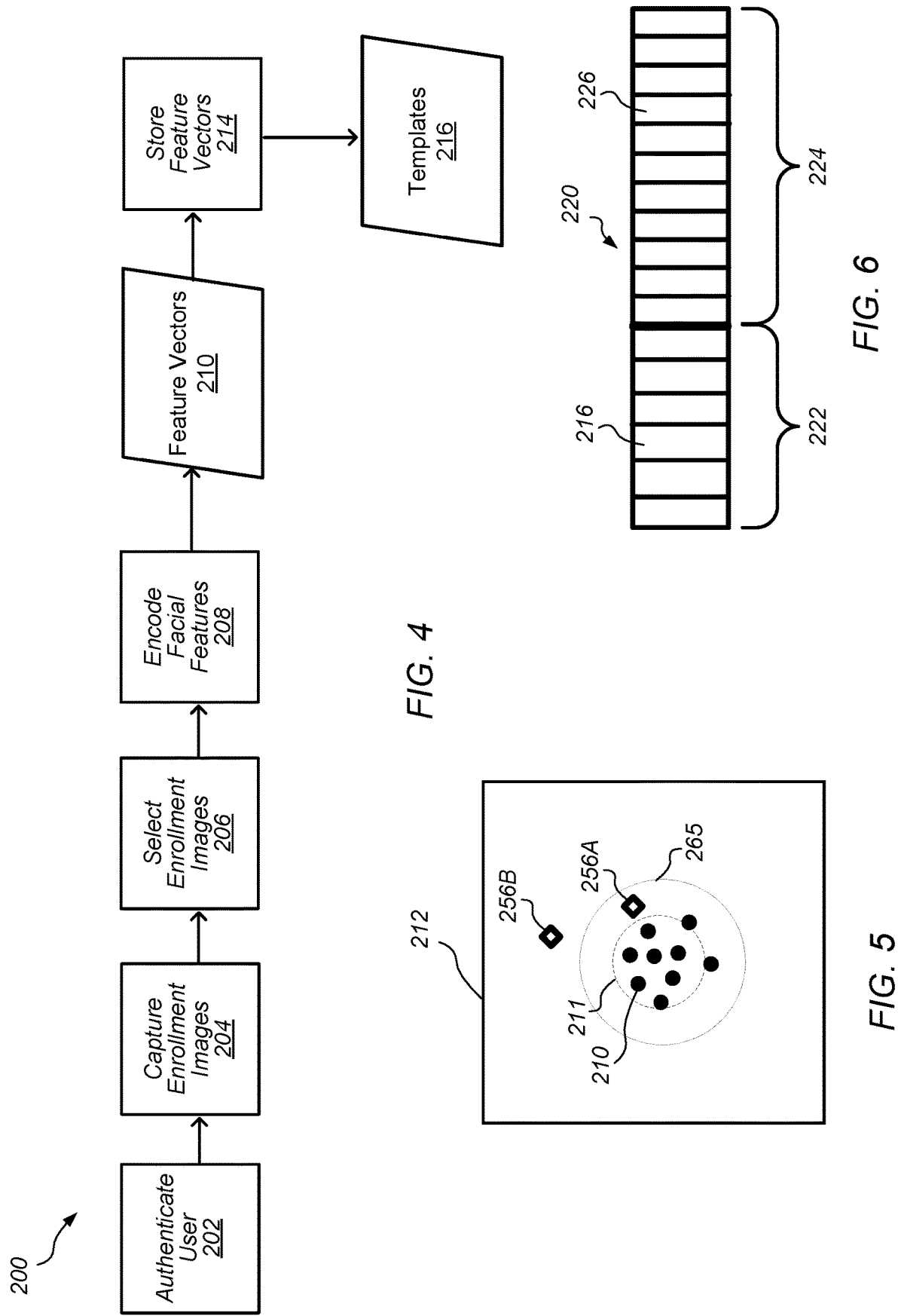

VIRTUAL TEMPLATES FOR FACIAL RECOGNITION

PRIORITY CLAIM

This patent claims priority to U.S. Provisional Patent Application No. 62/679,849 to Mostafa et al., entitled "VIRTUAL TEMPLATES FOR FACIAL RECOGNITION", filed Jun. 3, 2018, which is incorporated by reference in their entirety.

BACKGROUND

1. Technical Field

Embodiments described herein relate to methods and systems for face detection and recognition in images captured by a camera on a device. More particularly, embodiments described herein relate to the enrollment of a profile for face recognition of the user and methods for updating the profile based on the user's behavior during use of the device.

2. Description of Related Art

Biometric authentication processes are being used more frequently to allow users to more readily access their devices without the need for passcode or password authentication. One example of a biometric authentication process is fingerprint authentication using a fingerprint sensor. Facial recognition is another biometric process that may be used for authentication of an authorized user of a device. Facial recognition processes are generally used to identify individuals in an image and/or compare individuals in images to a database of individuals to match the faces of individuals.

For authentication using facial recognition, an authorized user typically follows an enrollment protocol to register the user's face on the device for future unlocking of the device using facial recognition authentication. The enrollment protocol typically has the user follow a controlled regiment to capture the user's face in different poses and/or positions in order to provide the best possible experience for the user in unlocking the device. Generally, however, many users operate the device with different behavior than is exhibited during the enrollment process. Thus, there may be potential for the device to provide an even better user experience by generating additional protocols for unlocking the device based on the user's behavior in actual operation of the device after enrollment.

SUMMARY

Templates for facial recognition may be generated from enrollment images of the user obtained by a camera associated with a device. The enrollment images may be captured during an enrollment process on the device. The templates generated from enrollment may be added to a template space in the device for use during a facial recognition authentication process. After enrollment, the user may attempt to gain access to (e.g., unlock) the device using the facial recognition authentication process. During the facial recognition authentication process, a captured image of the user may be encoded to generate feature vectors for an "unlock" image (e.g., an image captured to unlock the device) that are then compared to the template space.

If the unlock image is successful in unlocking the device, the generated feature vectors may be stored as temporary templates in the device. Additional temporary templates may be added as the user continues to successfully unlock the device using the facial recognition authentication process. After a number of temporary templates have been added, the temporary templates may be assessed to select a "virtual" template from the temporary templates. The virtual template may be, for example, a median template in a cluster of the temporary templates in a feature space. As the user continues to use the device, the performance of the virtual template in the facial recognition authentication process may be tracked or monitored over a period of time. The performance of the virtual template in the facial recognition authentication process may be compared to the performance of the templates in the template space to determine if the virtual template is to be added to the template space for future operation of the device.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIG. 4 depicts a flowchart of an embodiment of an image enrollment process for an authorized user of a device.

FIG. 5 depicts a representation of an embodiment of a feature space with feature vectors after an enrollment process.

FIG. 6 depicts a representation of an embodiment of a template space for an enrollment profile in a memory of a device.

Figure 1:
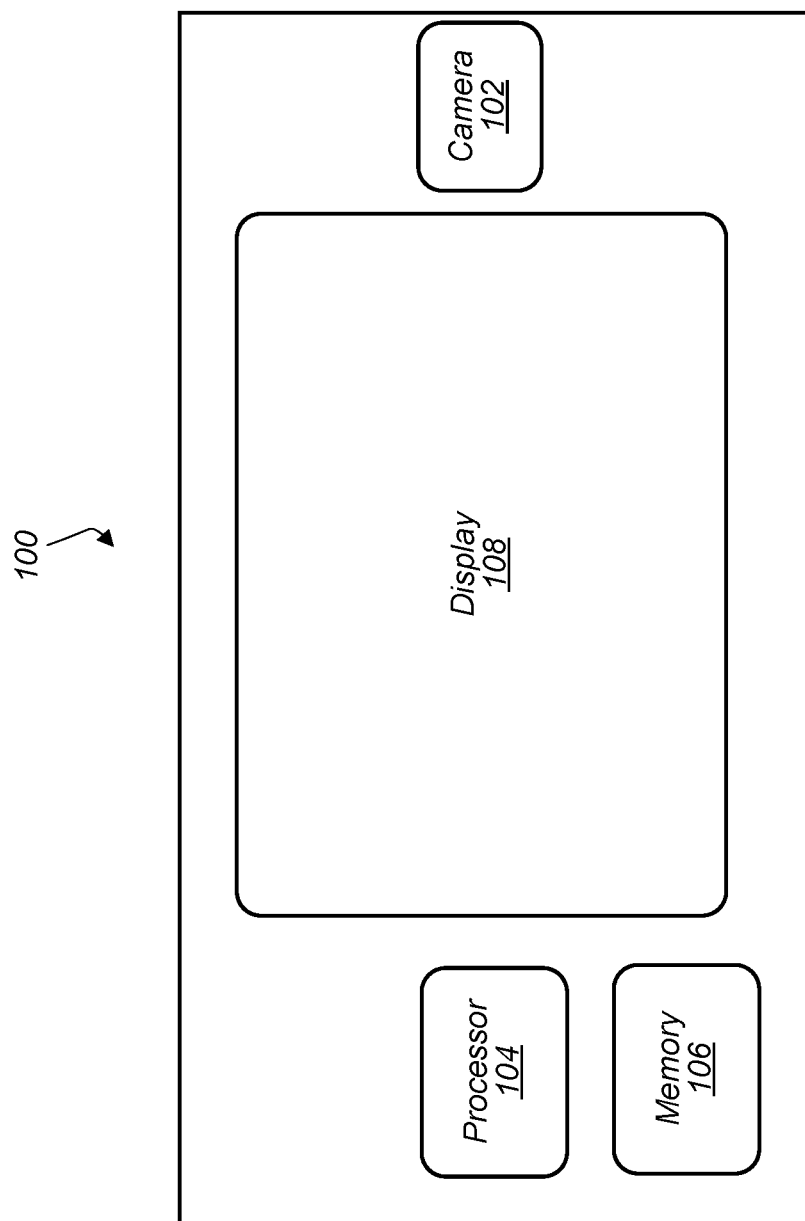
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
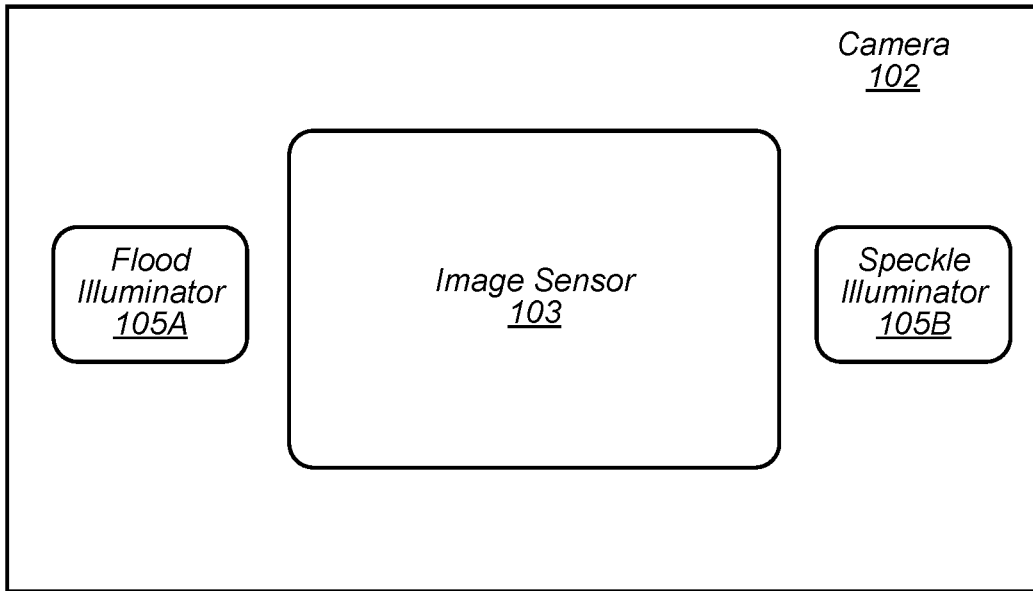
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a pattern (speckle pattern) projector). In some embodiments, the flood IR source and pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light.

Depth information may be captured using any suitable depth imaging system, examples of which include structured light and time of flight systems. In some instances, the depth imaging system may utilize an illuminator in providing depth detection or generating a depth map image. For example, illuminator 105B may provide IR illumination with a pattern (e.g., patterned infrared (IR) illumination). The pattern may be a pattern of light with a known, and controllable, configuration and pattern projected onto a subject (e.g., a structured pattern of light). In certain embodiments, the pattern is a speckle pattern (e.g., a pattern of dots). The pattern may, however, include any structured or semi-structured pattern of light features. For example, the pattern may include, but not be limited to, dots, speckles, stripes, dashes, nodes, edges, and combinations thereof.

Illuminator 105B may include a VCSEL array configured to form the pattern or a light source and patterned transparency configured to form the pattern. The configuration and pattern of the pattern provided by illuminator 105B may be selected, for example, based on a desired pattern density (e.g., speckle or dot density) at the subject. Image sensor 103 may capture images of the subject illuminated by the pattern. The captured image of the pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
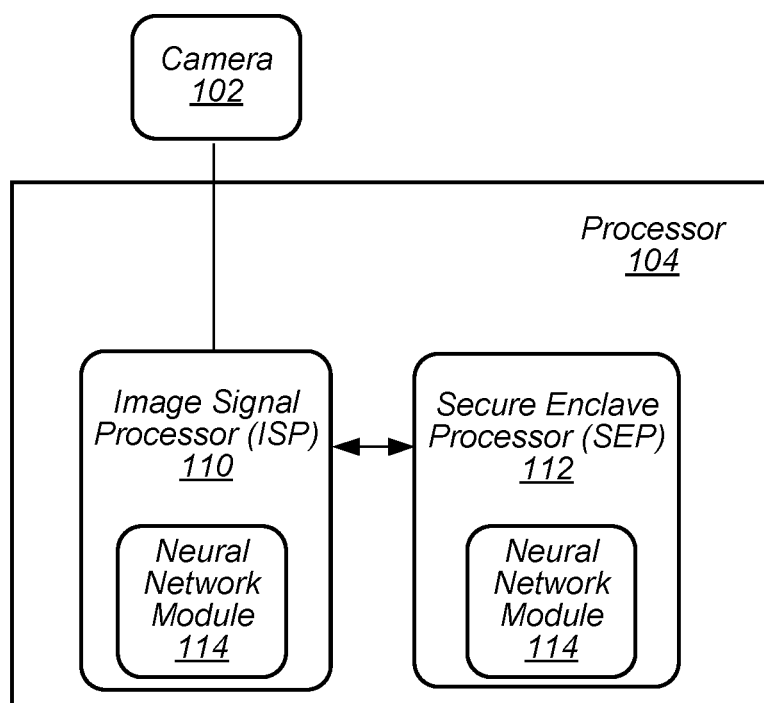
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., image enrollment process 200, as shown in FIG. 4, or a registration process) to capture images (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process (e.g., first template update process 300 and/or second template update process 400 described herein) may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a patterned illumination image used to generate a depth map image). In certain embodiments, ISP 110 and/or SEP 112 process the flood IR images and patterned illumination images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and patterned illumination images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and patterned illumination image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

FIG. 4 depicts a flowchart of an embodiment of image enrollment process 200 for an authorized user of device 100. Process 200 may be used to create an enrollment profile for an authorized user of device 100 that is stored in the device (e.g., in a memory coupled to SEP 112). The enrollment profile may include one or more templates for the authorized user created using process 200. The enrollment profile and the templates associated with the enrollment profile may be used in a facial recognition process to allow (e.g., authorize) the user to use the device and/or perform operations on the device (e.g., unlock the device).

In certain embodiments, process 200 is used when device 100 is used a first time by the authorized user and/or when the user opts to create an enrollment profile for a facial recognition process. For example, process 200 may be initiated when device 100 is first obtained by the authorized user (e.g., purchased by the authorized user) and turned on for the first time by the authorized user. In some embodiments, process 200 may be initiated by the authorized user when the user desires to enroll in a facial recognition process, update security settings for device 100, re-enroll, and/or add an enrollment profile on the device.

In certain embodiments, process 200 begins with authenticating the user in 202. In 202, the user may be authenticated on device 100 using a non-facial authentication process. For example, the user may be authenticated as an authorized user by entering a passcode, entering a password, or using another user authentication protocol other than facial recognition. After the user is authenticated in 202, one or more enrollment (e.g., reference or registration) images of the user are captured in 204. The enrollment images may include images of the user illuminated by flood illuminator 105A (e.g., flood IR images) and/or images of the user illuminated by illuminator 105B (e.g., patterned illumination images). As described herein, flood IR images and patterned illumination images may be used independently and/or in combination in facial recognition processes on device 100 (e.g. the images may independently be used to provide an authentication decision and the decisions may be combined to determine a final decision on user authentication).

The enrollment images may be captured using camera 102 as the user interacts with device 100. For example, the enrollment images may be captured as the user follows prompts on display 108 of device 100. The prompts may include instructions for the user to make different motions and/or poses while the enrollment images are being captured. During 204, camera 102 may capture multiple images for each motion and/or pose performed by the user. Capturing images for different motions and/or different poses of the user where the images still have a relatively clear depiction of the user may be useful in providing a better variety of enrollment images that enable the user to be authenticated without having to be in a limited or restricted position relative to camera 102 on device 100.

After the multiple enrollment images are captured in 204, selection of enrollment images for further image processing may be made in 206. Selection of enrollment images 206, and further processing of the images, may be performed by ISP 110 and/or SEP 112. Selection of enrollment images for further processing may include selecting images that are suitable for generating templates. For example, the selection of images that are suitable for use generating templates in 206 may include assessing one or more selected criteria for the images and selecting images that meet the selected criteria. The selected images may be used to generate templates for the user. Selected criteria may include, but not be limited to, the face of the user being in the field of view of the camera, a pose of the user's face being proper (e.g., the user's face is not turned to far in any direction from the camera (i.e., the pitch, yaw, and/or roll of the face are not above certain levels), a distance between camera 102 and the face of the user being in a selected distance range, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, if more than one face is detected in an enrollment image, the enrollment image is rejected and not used (e.g., not selected) for further processing. Selection of images suitable for further processing may be rule based on the images meeting a certain number of the selected criteria or all of the selected criteria. In some embodiments, occlusion maps and/or landmark feature maps are used in identifying features of the user (e.g., facial features such as eyes, nose, and mouth) in the images and assessing the selected criteria in the images.

After images are selected in 206, features of the user in the selected (template) images may be encoded in 208. Encoding of the selected images may include encoding features (e.g., facial features) of the user to define the features in the images as one or more feature vectors in a feature space. Feature vectors 210 may be the output of the encoding in 208. A feature space may be an n-dimensional feature space. A feature vector may be an n-dimensional vector of numerical values that define features from the image in the feature space (e.g., the feature vector may be a vector of numerical values that define facial features of the user in the image).

FIG. 5 depicts a representation of an embodiment of feature space 212 with feature vectors 210. Each feature vector 210 (black dot) may define facial features for the user from either a single image, from a composite image (e.g., an image that is a composite of several images), or from multiple images. As feature vectors 210 are generated from a single user's facial features, the feature vectors may be similar to one another because the feature vectors are associated with the same person and may have some "clustering", as shown by circle 211 in FIG. 5. Feature vectors 256A and 256B (open diamonds) are feature vectors obtained from facial recognition process 250, described below.

As shown in FIG. 4, process 200 may include, in 214, storing feature vectors 210 in a memory of device 100 (e.g., a memory protected by SEP 112). In certain embodiments, feature vectors 210 are stored as static templates 216 (e.g., enrollment templates or reference templates) in a template space of the memory (e.g., template space 220 described below). Static templates 216 may be used for the enrollment profile created by process 200. In some embodiments, static templates 216 (and other templates described herein) include separate templates for feature vectors obtained from the enrollment flood IR images and for feature vectors obtained from the enrollment patterned illumination images. It is to be understood that the separate templates obtained from flood IR images and patterned illumination images (e.g., images used to generate depth map images) may be used independently and/or in combination during additional processes described herein. For simplicity in this disclosure, static templates 216 are described generically and it should be understood that static templates 216 (and the use of the templates) may refer to either templates obtained from flood IR images or templates obtained from patterned illumination images. In some embodiments, a combination of the flood IR images and patterned illumination images may be used to generate templates. For example, pairs of feature vectors obtained from flood IR images and patterned illumination images may be stored in static templates 216 to be used in one or more facial recognition processes on device 100.

FIG. 6 depicts a representation of an embodiment of template space 220 for an enrollment profile in memory 106 of device 100. In certain embodiments, template space 220 is located in a portion of memory 106 of device 100 protected by SEP 112. In some embodiments, template space 220 includes static portion 222 and dynamic portion 224. Static templates 216 may be, for example, added to static portion 222 of template space 220 (e.g., the templates are permanently added to the memory and are not deleted or changed unless the device is reset). In some embodiments, static portion 222 includes a certain number of static templates 216. For example, for the embodiment of template space 220 depicted in FIG. 6, six static templates 216 are allowed in static portion 222. In some embodiments, nine static templates 216 may be allowed in static portion 222. Other numbers of static templates 216 in static portion 222 may also be contemplated. After the enrollment process for the enrollment profile is completed and static templates 216 are added to static portion 222, additional dynamic templates 226 may be added to dynamic portion 224 of template space 220 for the enrollment profile (e.g., a portion from which templates may be added and deleted without a device reset being needed).

Static templates 216 may thus be enrollment templates (or reference templates) generated by enrollment process 200 for the enrollment profile associated with the enrollment process. After enrollment process 200 is completed, a selected number of static templates 216 are stored in static portion 222 of template space 220 for the enrollment profile. The number of static templates 216 stored in static portion 222 after enrollment process 200 may vary depending on, for example, the number of different feature vectors obtained during the enrollment process, which may be based on the number of images selected to be suitable for use as template images, or a desired number of templates for the device. After enrollment process 200, static templates 216 include feature vectors 210 (e.g., the enrollment or reference feature vectors) that can be used for facial recognition of the authorized user associated with the enrollment profile. Thus, template space 220 may be used in a facial recognition authentication process to authorize the user associated with the enrollment profile.

Figure 7:
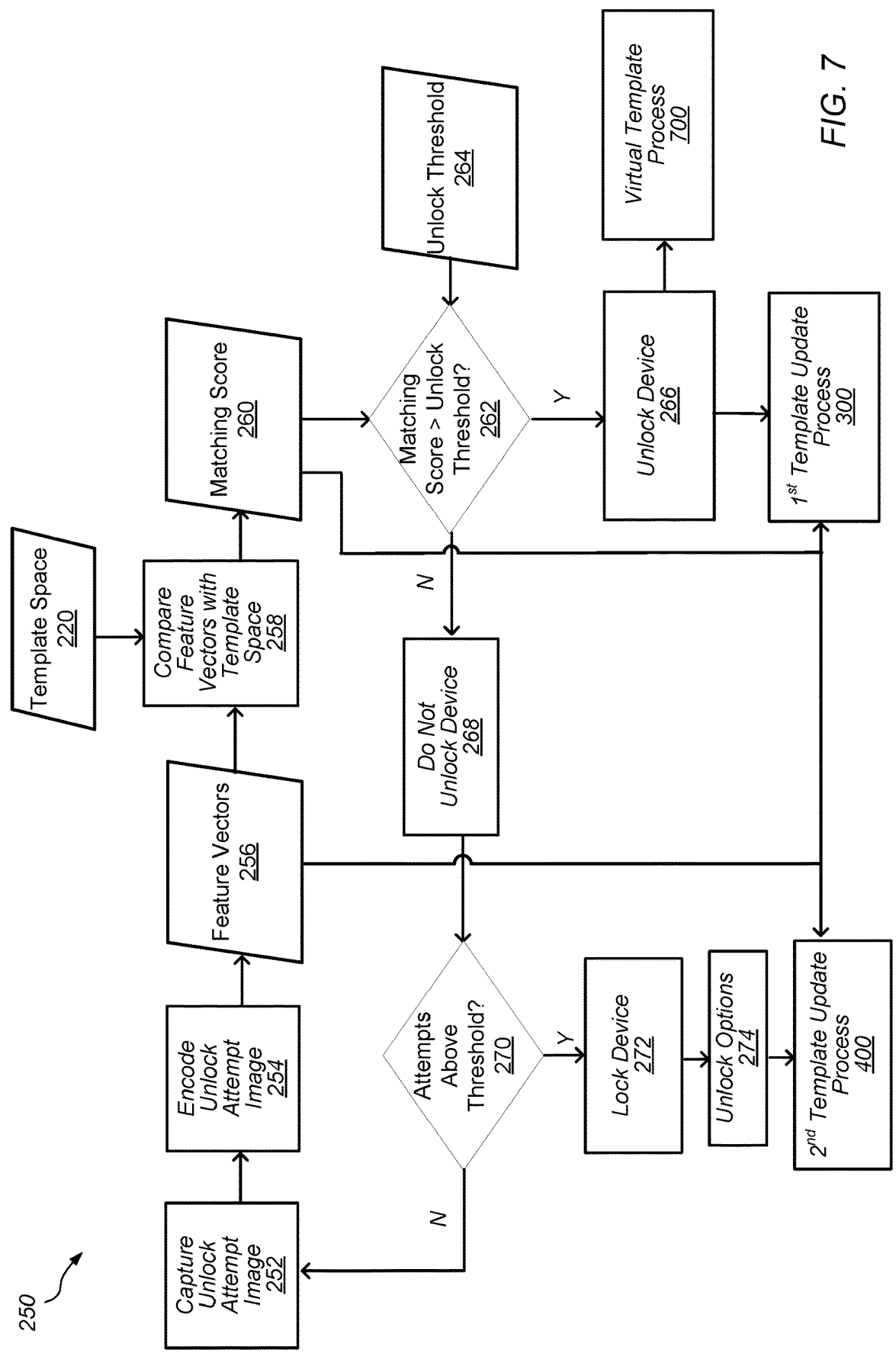
FIG. 7 depicts a flowchart of an embodiment of a facial recognition authentication process.

FIG. 7 depicts a flowchart of an embodiment of facial recognition authentication process 250. Process 250 may be used to authenticate a user as an authorized user of device 100 using facial recognition of the user. In certain embodiments, process 250 is used to authenticate a user using an enrollment profile (e.g., template space 220) on device 100. Authentication of the authorized user may allow the user to access and use device 100 (e.g., unlock the device) and/or have access to a selected functionality of the device (e.g., unlocking a function of an application running on the device, payment systems (i.e., making a payment), access to personal data, expanded view of notifications, etc.). In certain embodiments, process 250 is used as a primary biometric authentication process for device 100 (after enrollment of the authorized user). In some embodiments, process 250 is used as an authentication process in addition to another authentication process (e.g., fingerprint authentication, another biometric authentication, passcode entry, password entry, and/or pattern entry). In some embodiments, another authentication process (e.g., passcode entry, pattern entry, other biometric authentication) may be used to access device 100 if the user fails to be authenticated using process 250.

In 252, camera 102 captures an image of the face of the user attempting to be authenticated for access to device 100 (e.g., the camera captures an "unlock attempt" image of the user). It is to be understood that the unlock attempt image may be a single image of the face of the user (e.g., a single flood IR image or single patterned illumination image) or the unlock attempt image may be a series of several images of the face of the user taken over a short period of time (e.g., one second or less). In some embodiments, the series of several images of the face of the user includes pairs of flood IR images and patterned illumination images (e.g., pairs of consecutive flood IR and patterned illumination images). In some implementations, the unlock attempt image may be a composite of several images of the user illuminated by the flood illuminator and the pattern illuminator.

Camera 102 may capture the unlock attempt image in response to a prompt by the user or a user generated request. For example, the unlock attempt image may be captured when the user attempts to access to device 100 by pressing a button (e.g., a home button or virtual button) on device 100, by moving the device into a selected position relative to the user's face (e.g., the user moves the device such that the camera is pointed directly at the user's face), and/or by making a specific gesture or movement with respect to the device (e.g., tapping on the screen, swiping the user's finger across the display, or picking the device off the table). It is to be understood that, as described herein, unlock attempt images may include either flood IR images or patterned illumination images, or a combination thereof. Further, the unlock attempt images may be processed in association with their corresponding template (e.g., flood IR images with a template for flood IR enrollment images) independently or in combination as needed.

Additionally, unlock attempt images may include images that have been processed using a face detection process to determine and locate one or more faces in the images. Images that are further processed in process 250 (e.g., encoded in 254) may include only images in which at least one face has been detected. If no face is detected in an unlock attempt image, the unlock attempt image may be discarded and additional unlock attempt images may be captured (either automatically or after user input) until a face is detected in the captured unlock attempt images. Examples of face detection processes are described in U.S. patent application Ser. No. 15/910,551 to Gernoth et al. and U.S. Provisional Patent Application No. 62/679,850 to Kumar et al., which are incorporated by reference as if fully set forth herein.

In 254, the unlock attempt image is encoded to define the facial features of the user as one or more feature vectors in the feature space. In some embodiments, one feature vector is defined for the unlock attempt image. In some embodiments, multiple feature vectors are defined for the unlock attempt image. Unlock feature vector(s) 256 may be the output of the encoding of the unlock attempt image in 254.

In certain embodiments, in 258, unlock feature vector(s) 256 are compared to feature vectors in the templates of template space 220 to get matching score 260 for the unlock attempt image. In certain embodiments, template space 220 is the template space for an enrollment profile on device 100. Matching score 260 may be a score of the differences between feature vector(s) 256 and feature vectors in template space 220 (e.g., feature vectors in static templates 216 and/or other dynamic templates 226 added to the template space as described herein). The closer (e.g., the less distance or less differences) that feature vector(s) 256 and the feature vectors in template space 220 are, the higher matching score 260 may be. For example, as shown in FIG. 5, feature vector 256A (open diamond) is closer to feature vectors 210 than feature vector 256B (open diamond)(e.g., feature vector 256B is a further outlier than feature vector 256A). Thus, feature vector 256A would have a higher matching score than feature vector 256B. As feature vector 256B is further away from feature vectors 210 than feature vector 256A, the lower matching score for feature vector 256B means less confidence that the face in the unlock attempt image associated with feature vector 256B is the face of the authorized user associated with the enrollment profile and template space 220.

In some embodiments, comparing feature vector(s) 256 and templates from template space 220 to get matching score 260 includes using one or more classifiers or a classification-enabled network to classify and evaluate the differences between feature vector(s) 256 and templates from template space 220. Examples of different classifiers that may be used include, but are not limited to, linear, piecewise linear, nonlinear classifiers, support vector machines, and neural network classifiers. In some embodiments, matching score 260 is assessed using distance scores between feature vector(s) 256 and templates from template space 220.

In 262, matching score 260 is compared to unlock threshold 264 for device 100. Unlock threshold 264 may represent a minimum difference (e.g., distance in the feature space) in features (as defined by feature vectors) between the face of the authorized user and the face of the user in the unlock attempt image that device 100 requires in order to unlock the device (or unlock a feature on the device). For example, unlock threshold 264 may be a threshold value that determines whether the unlock feature vectors (e.g., feature vectors 256) are similar enough (e.g., close enough) to the templates associated with the authorized user's face (e.g., static templates 216 in template space 220). As further example, unlock threshold 264 may be represented by circle 265 in feature space 212, depicted in FIG. 5. As shown in FIG. 5, feature vector 256A is inside circle 265 and thus feature vector 256A would have matching score 260 above unlock threshold 264. Feature vector 256B, however, is outside circle 265 and thus feature vector 256B would have matching score 260 below unlock threshold 264. In certain embodiments, unlock threshold 264 is set during manufacturing and/or by the firmware of device 100. In some embodiments, unlock threshold 264 is updated (e.g., adjusted) by device 100 during operation of the device as described herein.

As shown in FIG. 7, in 262, if matching score 260 is above unlock threshold 264 (i.e., the user's face in the unlock attempt image substantially matches the face of the authorized user), the user in the unlock attempt image is authenticated as the authorized user for the enrollment profile on device 100 and the device is unlocked in 266. In some embodiments, after device 100 is unlocked in 266, unlock feature vectors 256 are provided to "virtual" template process 700, shown in FIG. 8. In certain embodiments, after device 100 is unlocked in 266, unlock feature vectors 256 and matching score 260 are provided to first template update process 300, shown in FIG. 11, which may add or replace templates in template space 220.

In 262, if matching score 260 is below unlock threshold 264 (e.g., not equal to or above the unlock threshold), then device 100 is not unlocked in 268 (e.g., the device remains locked). It should be noted that device 100 may be either locked or unlocked if matching score 260 is equal to unlock threshold 264 depending on a desired setting for the unlock threshold (e.g., tighter or looser restrictions). Additionally, either option for an equal matching score comparison may be also applied as desired for other embodiments described herein.

In certain embodiments, the unlock attempts are compared to a threshold in 270. The threshold may be, for example, a maximum number of unlock attempts allowed or a maximum allotted time for unlock attempts. In certain embodiments, a number of unlock attempts is counted (e.g., the number of attempts to unlock device 100 with a different unlock attempt image captured in 252) and compared to the maximum number of unlock attempts allowed.

In certain embodiments, if the unlock attempts reaches the threshold (e.g., number of unlock attempts reaches the maximum number of attempts allowed), then device 100 is locked from further attempts to use facial authentication in 272. In some embodiments, when the device is locked in 272, an error message may be displayed (e.g., on display 108) indicating that facial recognition authentication process 250 has failed and/or the desired operation of device 100 is restricted or prevented from being performed. Device 100 may be locked from further attempts to use facial authentication in 272 for a specified period of time and/or until another authentication protocol is used to unlock the device. For example, unlock options 274 may be used to unlock device 100.

Unlock options 274 may include the user being presented with one or more options for proceeding with a different type of authentication to unlock or access features on device 100 (e.g., the user is presented options for proceeding with a second authentication protocol). Presenting the options may include, for example, displaying one or more options on display 108 of device 100 and prompting the user through audible and/or visual communication to select one of the displayed options to proceed with unlocking the device or accessing features on the device. The user may then proceed with unlocking/accessing device 100 using the selected option and following additional audible and/or visual prompts as needed. After successfully being authenticated using the selected option, the user's initial request for unlocking/accessing device 100 may be granted. Unlock options 274 may include, but not be limited to, using a passcode, a password, pattern entry, a different form of biometric authentication, or another authentication protocol to unlock device 100. In some embodiments, unlock options 274 includes providing a "use passcode/password/pattern" affordance that, when selected causes display of a passcode/password/pattern entry user interface, or a passcode/password/pattern entry user interface, or a "use fingerprint" prompt that, when displayed, prompts the user to place a finger on a fingerprint sensor for the device. In some embodiments, after device 100 is unlocked using the unlock options in 274, unlock feature vectors 256 and matching score 260 are provided to second template update process 400, shown in FIG. 14.

If the unlock attempts are below the threshold in 270 (e.g., number of unlock attempts are below the maximum number of attempts allowed), then process 250 may be run again (re-initiated) beginning with a new unlock attempt image of the user being captured in 252. In some implementations, device 100 automatically captures the new unlock attempt image of the user's face without prompting the user (e.g., capturing of the new image is automatically implemented and/or hidden from the user). In some implementations, device 100 notifies the user (either visually and/or audibly) that process 250 is being re-initiated. In some embodiments, device 100 may prompt the user to provide input to re-initiate process 250. For example, the user may be prompted to acknowledge or otherwise confirm (either visually and/or audibly) the attempt to re-initiate process 250.

Figure 8:
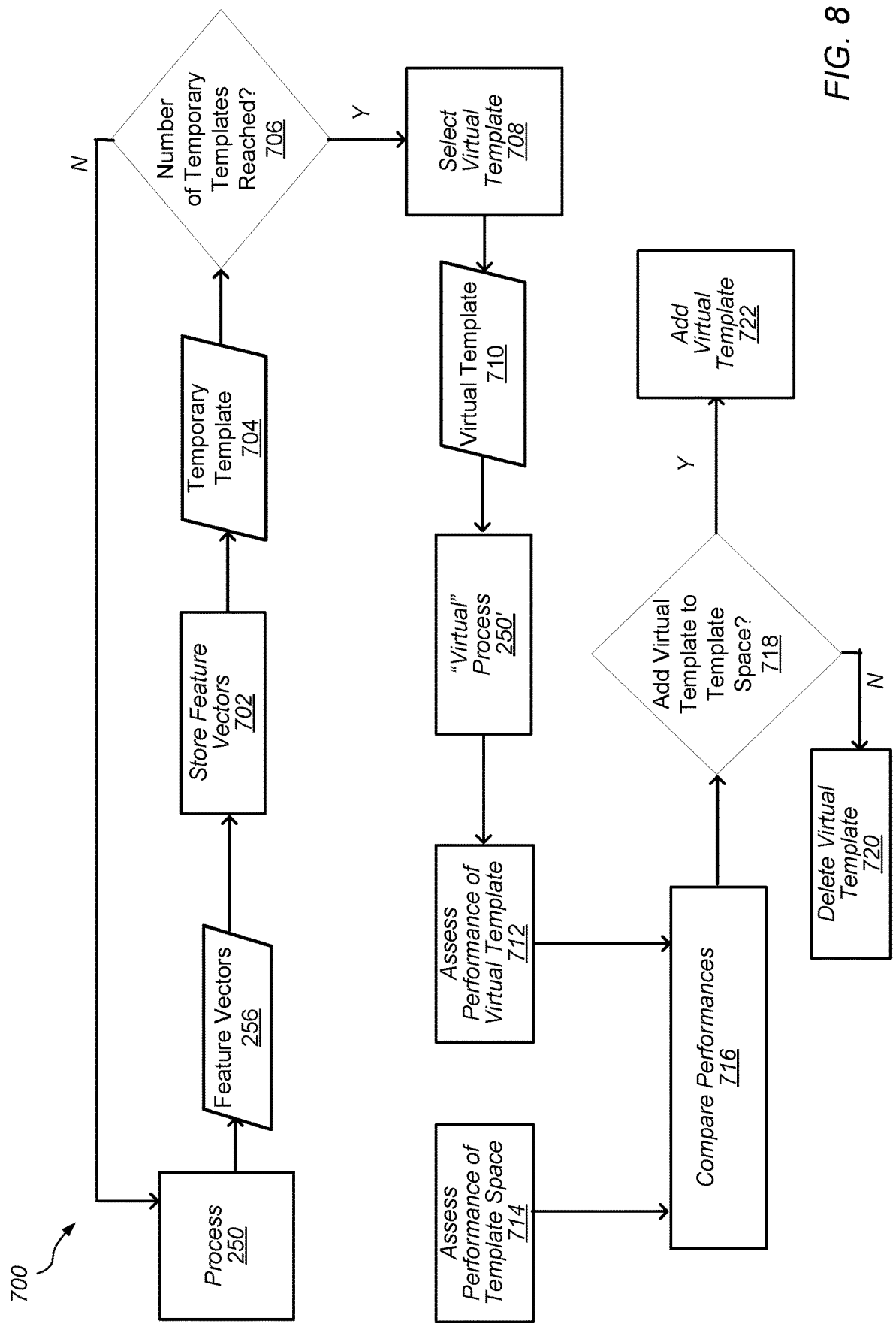
FIG. 8 depicts a flowchart of an embodiment of a "virtual" template process.

FIG. 8 depicts a flowchart of an embodiment of "virtual" template process 700. Process 700 may be used to add a "virtual" static template to template space 220. The virtual static template may be implemented into future operations of a facial recognition authentication process and the performance of the virtual static template may be assessed (e.g., monitored or tracked) during the future operations of the facial recognition authentication process.

Process 700 may begin with storing feature vector(s) 256 from process 250 in a space (e.g., a backup space) in the memory of device 100 in 702. Feature vector(s) 256 may be stored as temporary template 704. As feature vector(s) 256 are provided to process 700 after the feature vectors have matching score 260 above unlock threshold 264 (as shown in FIG. 7), temporary template 704 is generated from feature vectors that unlock device 100.

In 706, the number of temporary templates 704 stored in the memory device are counted and compared to a selected number of temporary templates (e.g., a threshold number of templates). The selected number of temporary templates may include a number of temporary templates suitable for a reasonable set of data (e.g., a number of templates that provides reasonable statistical results). In some embodiments, the selected number of temporary templates is a typical number of templates stored over a selected period of time (e.g., a number of templates typically stored over a number of days or a number of weeks).

If the number of temporary templates 704 is below the selected number in 706, then process 250 is operated again and additional feature vector(s) 256 from successful unlock attempts are added to generate additional temporary templates until the selected number is reached. Once the selected number of temporary templates 704 is reached in 706, process 700 may continue with selecting a temporary template in 708. Selecting the temporary template in 708 may include selecting the "virtual" template 710 for process 700.

Figure 9:
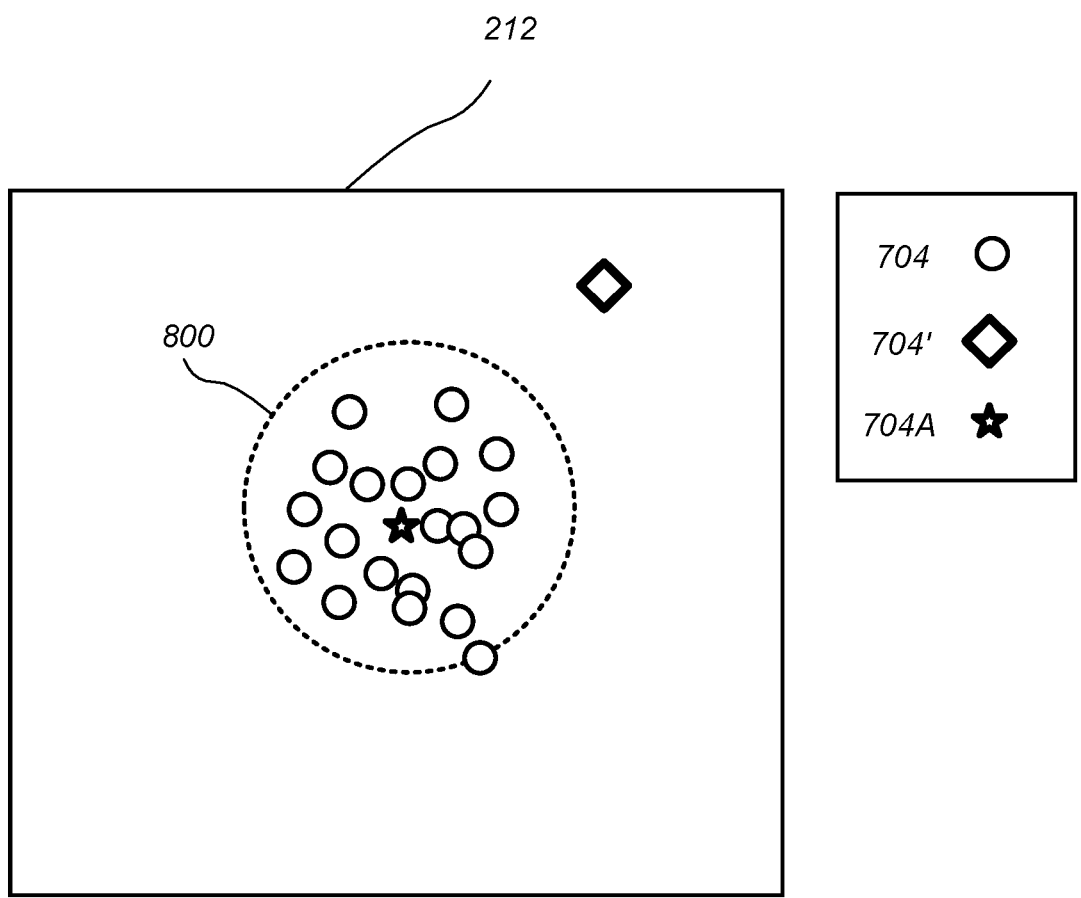
FIG. 9 depicts a representation of an embodiment of a feature space with temporary templates.

In certain embodiments, selecting the virtual template in 708 includes assessing temporary templates 704 to determine a median temporary template in the stored temporary templates. The median temporary template may be, for example, a median selected from a cluster of temporary templates 704 in a feature space. FIG. 9 depicts a representation of an embodiment of feature space 212 with temporary templates 704. As shown in FIG. 9, temporary templates 704 may form into a cluster of data. The cluster of temporary templates 704 may be represented by circle 800. In some embodiments, outlying temporary templates are not used in determining the cluster of templates (and thus the median template). For example, temporary template 704' may be an outlier temporary template that is not used for determining the cluster of templates. Assessment (e.g., analysis) of the cluster of temporary templates 704 may determine a median temporary template (e.g., temporary template 704A shown by the star in FIG. 9). The median temporary template 704A may then be selected as the "virtual" temporary template (e.g., "virtual" template 710 in process 700, as shown in FIG. 8).

In some embodiments, feature space 212 with temporary templates 704 may include multimodal clusters of template data. For example, two or more clusters of data may be present in the feature space with temporary template data. In some embodiments with multimodal clusters of temporary template data, a cluster may be chosen (e.g., a denser cluster or the cluster with more data points) and a median selected from the chosen cluster. In some embodiments with multimodal clusters of temporary template data, it may not be possible to choose a cluster. In such embodiments, the user being captured in the images may be chosen to not be suitable for process 700. The user being captured in the images may also be chosen to not be suitable for process 700 if no clusters can be determined from the temporary templates data.

Figure 10:
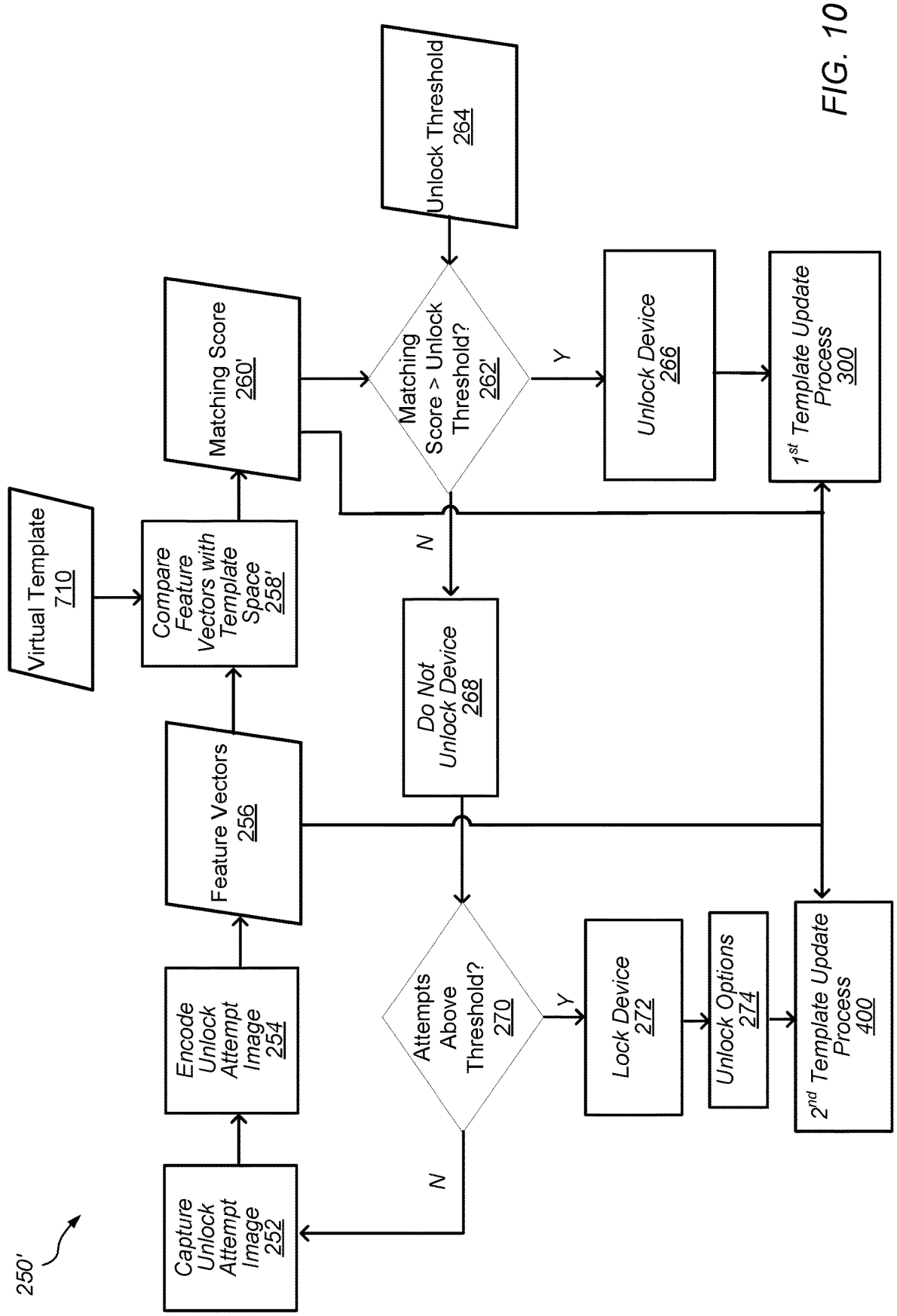
FIG. 10 depicts a flowchart of another embodiment of a facial recognition authentication process.

As shown in FIG. 8, after virtual template 710 is selected, the virtual template may be used in facial recognition authentication process 250'. FIG. 10 depicts a flowchart of an embodiment of facial recognition authentication process 250'. Process 250' may operate similar to process 250 (shown in FIG. 7) using virtual template 710 instead of template space 220. The thresholds in process 250' (e.g., unlock threshold 264 and the threshold in 270) may be the same as the thresholds in process 250. In some embodiments, virtual template 710 may also be updated using either first template update process 300 and/or second template update process 400 (described herein with respect to template space 220). Thus, virtual template 710 may be updated for changes to the user similar to template space 220.

Process 250' may operate substantially in parallel with process 250 for additional unlock attempts of device 100 after virtual template 710 has been selected. Process 250' and process 250 may operate on the same unlock attempt images 252 captured by device 100. Process 250' may operate to compare feature vectors 256 from the captured images to virtual template 710 in 258' and determine matching score 260'. Matching score 260' may then be used to determine whether device 100 is able to be unlocked using the virtual template. In certain embodiments, process 250' does not determine actual unlocking of device 100 (unlocking of the device is only determined by process 250). For example, process 250' is a "virtual" process that assesses the effectiveness of virtual template 710 for facial recognition authentication of the user while process 250 determines unlocking of device 100 using template space 220. As such, process 250' may be operated to assess the performance of virtual template 710 in comparison to template space 220. In some embodiments, process 250' may be used to determine unlocking of device 100 in addition to unlocking determine by process 250 (e.g., either process 250 or process 250' may unlock the device).

As shown in FIG. 8, the performance of virtual template 710 in process 250' is assessed in 712. Assessing the performance of virtual template 710 in 712 may include assessing any properties that determine the effectiveness or ineffectiveness of using virtual template in attempting to match a user in captured images to the authorized user of device 100. For example, assessing the performance in 712 may include assessing acceptance rates and/or rejection rates in process 250' using virtual template 710. The performance of virtual template 710 may be assessed in 712 over a selected time frame (e.g., a period of time) on device 100. In some embodiments, the performance of virtual template 710 may be assessed for a selected number of unlock attempts.

At the same time as the performance of virtual template 710 is being assessed in 712 for the additional unlock attempts, performance of template space 220 (being operated on in process 250) may be assessed in 714. Assessing the performance of template space 220 in 714 may include assessing the same properties assessed in 712 for virtual template 710. In 716, the performance of virtual template 710 assessed in 712 may be compared to the performance of template space 220 assessed in 714. Comparing the performances may include comparing the performances over the selected time frame or the selected number of unlock attempts.

In certain embodiments, in 718, a decision may be made if virtual template 710 is added to template space 220 or if the virtual template is to be deleted. For example, if the performance of virtual template 710 is determined, by comparison 716, to be less than the performance of static templates 216 in template space 220, then virtual template 710 may be deleted in 720. In some embodiments, after virtual template 710 is deleted in 720, process 700 may operate again beginning with an additional successful unlock attempt to generate a new virtual template for performance assessment.

In certain embodiments, if the performance of virtual template 710 is determined, by comparison 716, to be higher than at least one of static templates 216 in template space 220, then the virtual template may be added to the template space in 722. During the enrollment process (e.g., process 200), the user is asked to move and behave in certain ways to provide controlled image captures for generating static templates 216. Controlling the user's behavior during the image captures for enrollment generates static templates 216 that may provide satisfactory performance of the facial recognition authentication process for the user (e.g., the user encounters acceptable pass/fail rates for unlocking the device). Users may, however, typically operate device 100 with different behavior than the controlled behavior during the enrollment process. As virtual template 710 is generated based on the behavior of the user during unlock attempts of device 100 over a period of time, the virtual template may provide better and more satisfying unlock performance over time as compared to one or more static templates 216.

In some embodiments, adding virtual template 710 to template space 220 in 722 includes adding the virtual template and increasing the number of static templates in the template space (e.g., if there are nine static templates, adding the virtual template creates ten static templates in the template space). In some embodiments, adding virtual template 710 to template space 220 in 722 includes replacing one of static templates 216 in template space 220 with virtual template 710. For example, virtual template 710 may replace one of static templates 216 that the virtual template outperforms. In some embodiments, virtual template 710 replaces the lowest performing static template 216 in template space 220.

In some embodiments, adding virtual template 710 to template space 220 in 722 includes replacing more than one static template 216 in the template space. For example, virtual template 710 may replace all templates that the virtual template outperforms. In some embodiments, virtual template 710 may replace all static templates 216 in template space 220. In such embodiments, virtual template 710 becomes the only static template in template space 220. Virtual template 710 may become the only static template in template space 220 if, for example, the virtual template has a sufficient performance to provide suitable acceptance rates and rejection rates while providing minimal false acceptance and false rejection rates. Virtual template 710 may potentially provide better performance than static templates 216, which are obtained from enrollment images, because the virtual template is generated from actual use of device 100 by the user (e.g., based on "how" the user uses the device rather than the ideal scenarios used during enrollment).

In some implementations, a user may need more than one virtual template to provide suitable performance in replacing all static templates 216 obtained from enrollment. In some implementations, as described above, the performance of virtual template 710 may be determined to be less than the performance of static templates 216 in template space 220 and the virtual template is deleted. The performance of virtual template 710 may be less, for example, if the user has large variances in his/her behavior when attempting to unlock device 100. In some embodiments, additional mitigations may be applied to template space 220 after virtual template 710 is added to and/or replaces static templates 216 in the template space. Mitigations may be applied, for example, to prevent virtual template 710 from adversely affecting false acceptance and/or false rejection rates.

Figure 11:
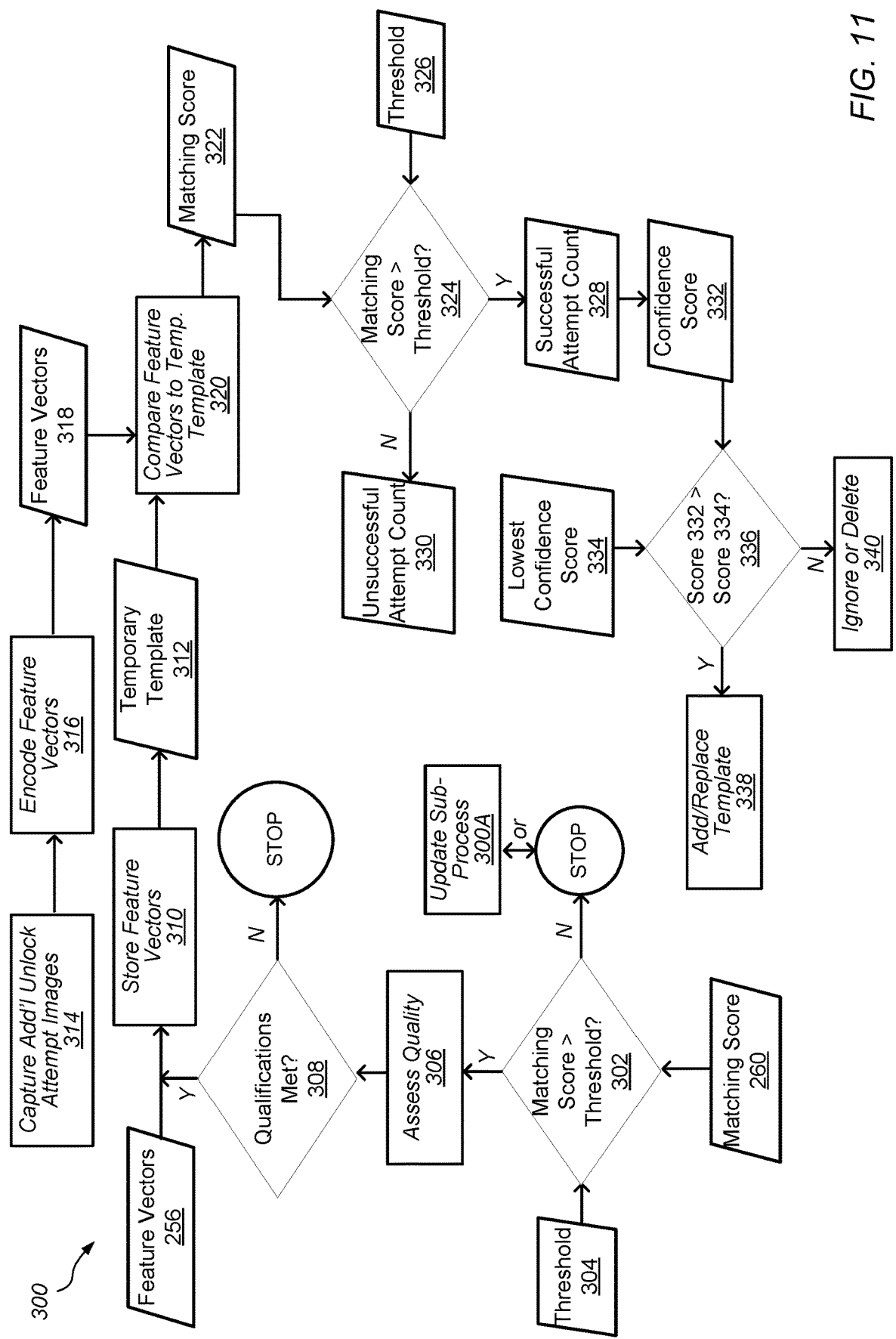
FIG. 11 depicts a flowchart of an embodiment of a template update process.

FIG. 11 depicts a flowchart of an embodiment of first template update process 300. Process 300 may be used to update template space 220 (shown in FIG. 6) with one or more additional dynamic templates 226 based on feature vector(s) 256 from process 250. In certain embodiments, process 300 is used to update template space 220 for an enrollment profile (e.g., the enrollment profile used in process 250) on device 100. Process 300 may be used to update template space 220 for gradual changes in the appearance of the authorized user associated with the enrollment profile. For example, process 300 may update template space 220 for gradual changes in hair (e.g., hair color, hair length, and/or hair style), weight gain, weight loss, changes in glasses worn, or small disfigurement changes (e.g., black eyes, scars, etc.). Updating template space 220 using process 300 allows the authorized user to continue to successfully access device 100 using facial recognition authentication process 250 despite the gradual changes in the appearance of the user.

Process 300 may begin by assessing 302 if matching score 260 is above threshold 304. Threshold 304 may be a threshold score for determining if feature vector(s) 256 are similar (e.g., close) enough to feature vectors 210 (from static templates 216) that feature vector(s) 256 may potentially be used as another template (e.g., the threshold score may determine if feature vectors 256 are within a certain distance of feature vectors 210). In certain embodiments, threshold 304 is greater than (above) unlock threshold 264 (e.g., threshold 304 requires a higher matching score than unlock threshold 264). Thus, the threshold for feature vector(s) 256 becoming a template may be stricter than the threshold for unlocking the device. Threshold 304 may be set during manufacturing and/or by the firmware of device 100. Threshold 304 may be updated (e.g., adjusted) by device 100 during operation of the device as described herein.

In some embodiments, if matching score 260 is below threshold 304, then process 300 is stopped and feature vector(s) 256 are deleted from device 100. In some embodiments, if matching score 260 is below threshold 304, then process 300 continues with template update sub-process 300A, described in FIG. 13. If matching score 260 is above threshold 304, then process 300 is continued. In some embodiments, after assessing 302, one or more qualities in the unlock attempt image are assessed in 306. For example, pose (e.g., pitch, yaw, and roll of the face), occlusion, attention, field of view, and/or distance in the unlock attempt image may be assessed in 306. Pose and/or occlusion in the unlock attempt image may be assessed using the landmark and/or occlusion maps described herein. In 308, if suitable qualifications are not met, then process 300 may be stopped. In certain embodiments, meeting suitable qualifications includes meeting selected criteria in the images for one or more of the assessed qualities described above. For example, selected criteria may include, but not be limited to, the face of the user being in the field of view of the camera, a pose of the user being proper (e.g., the user's face is not turned to far in any direction from the camera (i.e., the pitch, yaw, and/or roll of the face are not above certain levels) a distance to the face of the user being within a certain distance, the face of the user having occlusion below a minimum value (e.g., the user's face is not occluded (blocked) more than a minimum amount by another object), the user paying attention to the camera (e.g., eyes of the user looking at the camera), eyes of the user not being closed, and proper lighting (illumination) in the image. In some embodiments, assessing qualities in 306 and 308 may occur in a different location within process 300. For example, assessing qualities in 306 and 308 may occur after comparing matching score 324 to threshold 326 or after comparing confidence score 332 to confidence score 334 in 336, described below.

If suitable qualifications are met in 308, then process 300 continues, in 310, with storing feature vector(s) 256 in a backup space in the memory of device 100. The backup space in the memory may be, for example, a second space or temporary space in the memory that includes readable/writable memory and/or short term memory. Feature vector(s) 256 may be stored in the memory as temporary template 312.

In certain embodiments, after temporary template 312 is stored in the backup space in the memory, process 300 continues by comparing the temporary template to feature vectors for additional unlock attempt images captured by device 100 for the authorized user. In 314, additional unlock attempt images are captured of the user (or users if unauthorized access is attempted) as the user(s) during additional (future) unlocking attempts of device 100. The features of the face of the user in the additional unlock attempt images are encoded in 316 to generate feature vectors 318. In 320, feature vectors 318 are compared to temporary template 312 to get matching score 322.

Matching score 322 may then be compared in 324 to threshold 326. In some embodiments, threshold 326 is unlock threshold 264. In some embodiments, threshold 326 is threshold 304. If matching score 322 is above threshold 326 in 324, then a successful attempt is counted in 328. If matching score 322 is below threshold 326 in 324, then an unsuccessful attempt is counted in 330. Counts 328 and 330 may be continued until a desired number of unlock attempts are made (e.g., a desired number of comparisons of matching score 322 and threshold 326). Once the desired number of attempts is made, the number of successful attempts in 328 out of the total number of unlock attempts (e.g., the sum of counts 328 and 330) may be used to assess confidence score 332 for temporary template 312. For example, there may be 45 successful attempts out of 50 total unlock attempts so confidence score 332 is 45/50 or 90%. Confidence score 332 may be used to assess whether or not template 312 is added as dynamic template 226 to template space 220, shown in FIG. 6.

As described above, initially after enrollment, the enrollment templates (e.g., static templates 216, shown in FIG. 6) are added to static portion 222 of template space 220. After the enrollment process and static templates 216 are added to static portion 222, process 300, shown in FIG. 11, may be used to add additional templates to template space 220. Additional templates may be added to dynamic portion 224 as dynamic templates 226 (e.g., a portion from which templates may be added and deleted without a device reset being needed). Dynamic templates 226 may be used in combination with static templates 216 in template space 220 for facial recognition authentication process 250, shown FIG. 7.

In certain embodiments, temporary templates 312 generated by process 300, shown in FIG. 11, are added to dynamic portion 224 as dynamic templates 226, shown in FIG. 6, when confidence score 332 for temporary template 312 is higher than a lowest confidence score of static templates 216 in static portion 222. Confidence score 334 may be equal to a lowest confidence score for static templates 216 in static portion 222 assessed during the same unlock attempts used to assess confidence score 332 for temporary template 312 (e.g., the confidence score for the template with the lowest number of successful unlock attempts during the same unlock attempts using temporary template 312). Confidence score 334 may be assessed using the same threshold used for confidence score 332 (e.g., threshold 326).

In certain embodiments, if, in 336, confidence score 332 is greater than confidence score 334, then temporary template 312 is added, in 338, as dynamic template 226 in dynamic portion 224. For example, if temporary template 312 has 45 successful unlock attempts out of 50 total unlock attempts while one static template 216 only has 40 successful unlock attempts out of the same 50 total unlock attempts, then temporary template 312 may be added to dynamic portion 224 as one of dynamic templates 226. If, in 336, confidence score 332 is less than confidence score 334, then temporary template 312 is ignored or deleted in 340. Temporary templates 312 may be added until a maximum number of allowed dynamic templates 226 are stored in dynamic portion 224.

Once dynamic portion 224 reaches its maximum number of dynamic templates 226 in dynamic portion 224, temporary template 312 may replace one of dynamic templates 226 in 338. For example, temporary template 312 may replace one of dynamic templates 226 if the temporary template is less of an outlier than one of dynamic templates 226. In certain embodiments, statistical analysis of the feature vectors that represent dynamic templates 226 and temporary template 312 is used to assess if temporary template 312 is less of an outlier than one of dynamic templates 226. Statistical analysis may include, for example, classification algorithms operated on feature vectors for the templates.

Figure 12:
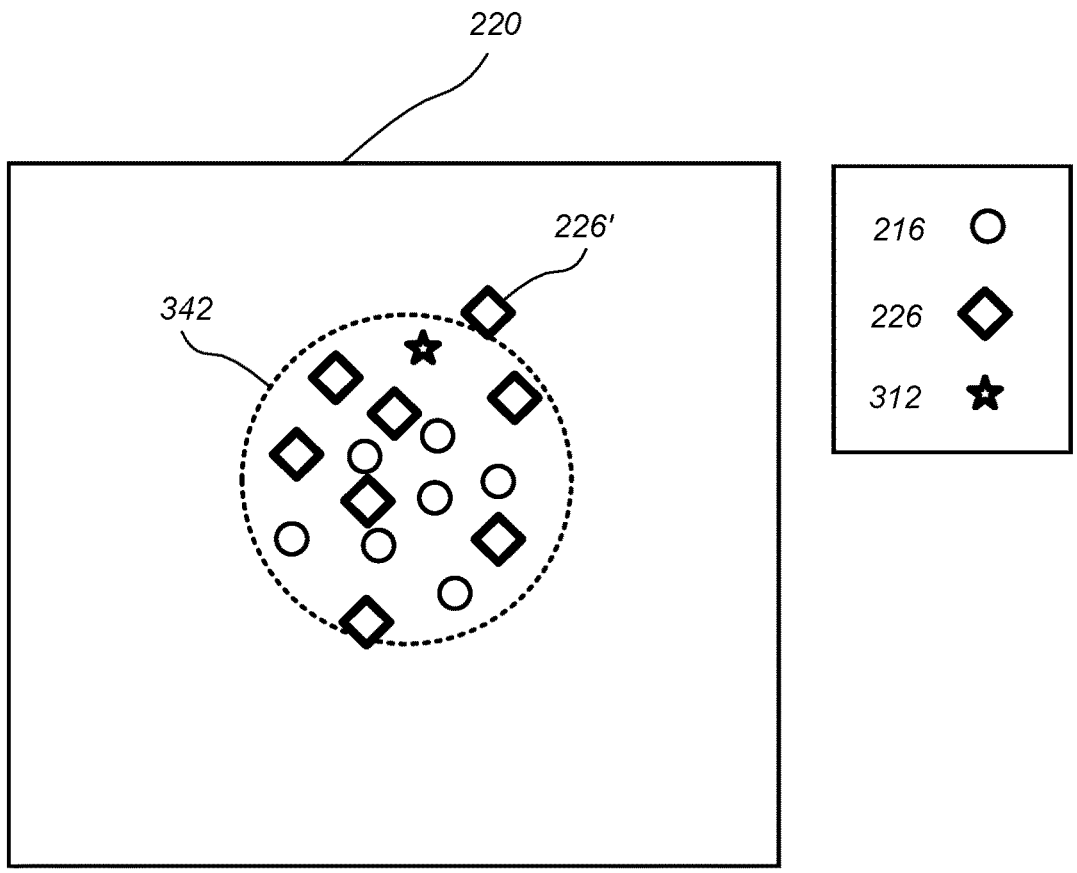
FIG. 12 depicts a representation of an embodiment of a template space represented as a feature space.

FIG. 12 depicts a representation of an embodiment of template space 220 represented as a feature space. In the feature space depiction of template space 220, static templates 216, dynamic templates 226, and temporary template 312 are represented by feature vectors. For example, static templates 216 are represented by circles, dynamic templates 226 are represented by diamonds, and temporary template 312 is represented by a star. In certain embodiments, as described above, static templates 216 are not allowed to be replaced by temporary template 312. Thus, if dynamic portion 224 has reached its maximum number of dynamic templates 226, temporary template 312 may replace one of dynamic templates 226 if temporary template 312 is less of an outlier than one of dynamic templates 226.

Statistical analysis of the feature vectors in the feature space correlating to template space 220 may generate a circle (e.g., circle 342) that most closely defines a maximum number of the feature vectors. As shown in FIG. 12, circle 342 defines the feature vector for dynamic template 226' as an outlier of the circle. The feature vector for dynamic template 226' is more of an outlier than the feature vector for temporary template 312. Thus, temporary template 312 may replace dynamic template 226' in template space 220. If temporary template 312 had been more of an outlier than each of dynamic templates 226, then the temporary template may not have replaced any one of dynamic templates 226.

In certain embodiments, when temporary template 312 replaces dynamic template 226' in template space 220, one or more thresholds for device 100 may be recalculated. As temporary template 312 is less of an outlier than dynamic template 226' recalculation of the threshold(s) may further restrict the thresholds (e.g., raise the threshold for matching scores to require closer matching). In some embodiments, the unlock threshold (e.g., unlock threshold 264, shown in FIG. 7) is made stricter when temporary template 312 replaces dynamic template 226' in template space 220. In some embodiments, a template update threshold (e.g., threshold 304, shown in FIG. 11) is made stricter when temporary template 312 replaces dynamic template 226' in template space 220.

Figure 13:
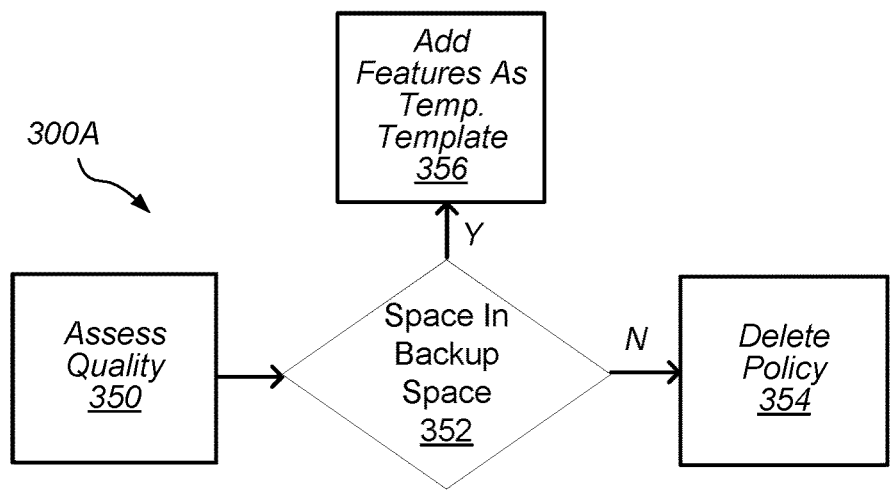
FIG. 13 depicts a flowchart of an embodiment of a template update sub-process.

FIG. 13 depicts a flowchart of an embodiment of template update sub-process 300A. As described above, sub-process 300A may proceed if matching score 260 is below threshold 304 but above unlock threshold 264. Images with matching scores 260 in such a range (above unlock threshold 264 and below threshold 304) may have more uncertainty in matching than images that are above threshold 304 (while still being able to unlock device 100). Thus, these more uncertain images may be processed using sub-process 300A.

In sub-process 300A, one or more qualities in the unlock attempt image are assessed in 350. Assessing qualities of the unlock attempt image in 350 may be substantially similar to assessing qualities in 306 and 308, as shown in FIG. 11. As shown in FIG. 13, if the unlock attempt image passes the assessment of qualities (e.g., meets qualifications) in 350, then a determination may be made in 352 if there is space (e.g., room) in the backup space used for temporary templates 312 to store another temporary template (e.g., a determination if a maximum number of temporary templates 312 are stored in the backup space).

If there is no room in the backup space ("N"), then the unlock attempt image (and its corresponding feature vectors) may be subject to delete policy 354, as shown in FIG. 13. In delete policy 354, the feature vector(s) in the backup space (e.g., space for temporary templates 312) that has selected redundancy (e.g., is most redundant) to the existing features may be replaced in the backup space.

If there is room in the backup space ("Y"), then the feature vectors for the unlock attempt image are added to the backup space as a temporary template (e.g., temporary template 312) in 356. Once the temporary template from sub-process 300A is added to the backup space in 356, the temporary template may be processed substantially as temporary template 312 (e.g., compared to additional unlock attempt images as shown in FIG. 11). In certain embodiments, the temporary template from sub-process 300A is used as a template (e.g., temporary template 312 and/or dynamic template 226) for a selected amount of time. For example, because the temporary template from sub-process 300A is originally added with a higher uncertainty than other templates, the amount of time allowed for use of the temporary template from sub-process 300A may be limited (e.g., the temporary template has a limited lifetime). In some embodiments, the selected amount of time is a maximum amount of successful unlock attempts using the temporary template from sub-process 300A.

As described above, first template update process 300 may be used to update an enrollment profile (e.g., templates in the template space) when device 100 is unlocked or accessed using facial authentication recognition process 250. First template update process 300 may be used, for example, to update the enrollment profile in response to gradual changes in a user's appearance (e.g., weight gain/loss).

In some embodiments, however, facial features of an authorized user (e.g., the user's facial appearance) may have changed drastically, or at least to a large enough extent, that the user may encounter difficulty unlocking or accessing features (e.g., operations) on device 100 using facial authentication recognition process 250, depicted in FIG. 7. Drastic or large extent changes in the user's facial appearance may include, for example, shaving of a beard or mustache, getting a large scar or other disfigurement to the face, making drastic changes in makeup, making drastic hair changes. In some cases, the user may also encounter difficulty in unlocking/accessing device 100 using facial authentication recognition process 250 if there was an error during the enrollment process and/or there are large differences between the user's environment during the unlock attempt and the time of enrollment. Encountering difficulty in unlocking device 100 using facial authentication recognition process 250 may be a frustrating experience for the user. When difficulty in unlocking device 100 using facial authentication recognition process 250 occurs due to the above described changes/issues, a second template update process (e.g., second template update process 400, described below) may be used to, at least temporarily, allow the user to unlock/access device using the facial authentication recognition process, despite the issues/changes, after verification of the user's identity using a second authentication protocol.

As shown in FIG. 7, the user may attempt a number of unlock attempts unsuccessfully using facial authentication recognition process 250 until the number of unsuccessful unlock attempts reaches the threshold in 270 and device 100 is locked from further attempts to use the facial authentication recognition process. At such time, the user may be presented with one or more options for proceeding with a different type of authentication to unlock or access features on device 100 in unlock options 274. After the user is successfully authenticated using the selected option, device 100 may, at least temporarily, update the user's enrollment profile (e.g., using second template update process 400 described below) to allow the user to be able to unlock/access the device in future unlock attempts using facial authentication recognition process 250 despite the changes in the user's facial appearance that previously prevented the user from using the facial authentication recognition process to unlock/access the device. Thus, the user, by successfully completing authentication using the selected option, may automatically be able to access device 100 using facial authentication recognition process 250 in future unlock attempts for at least a short period of time.

Figure 14:
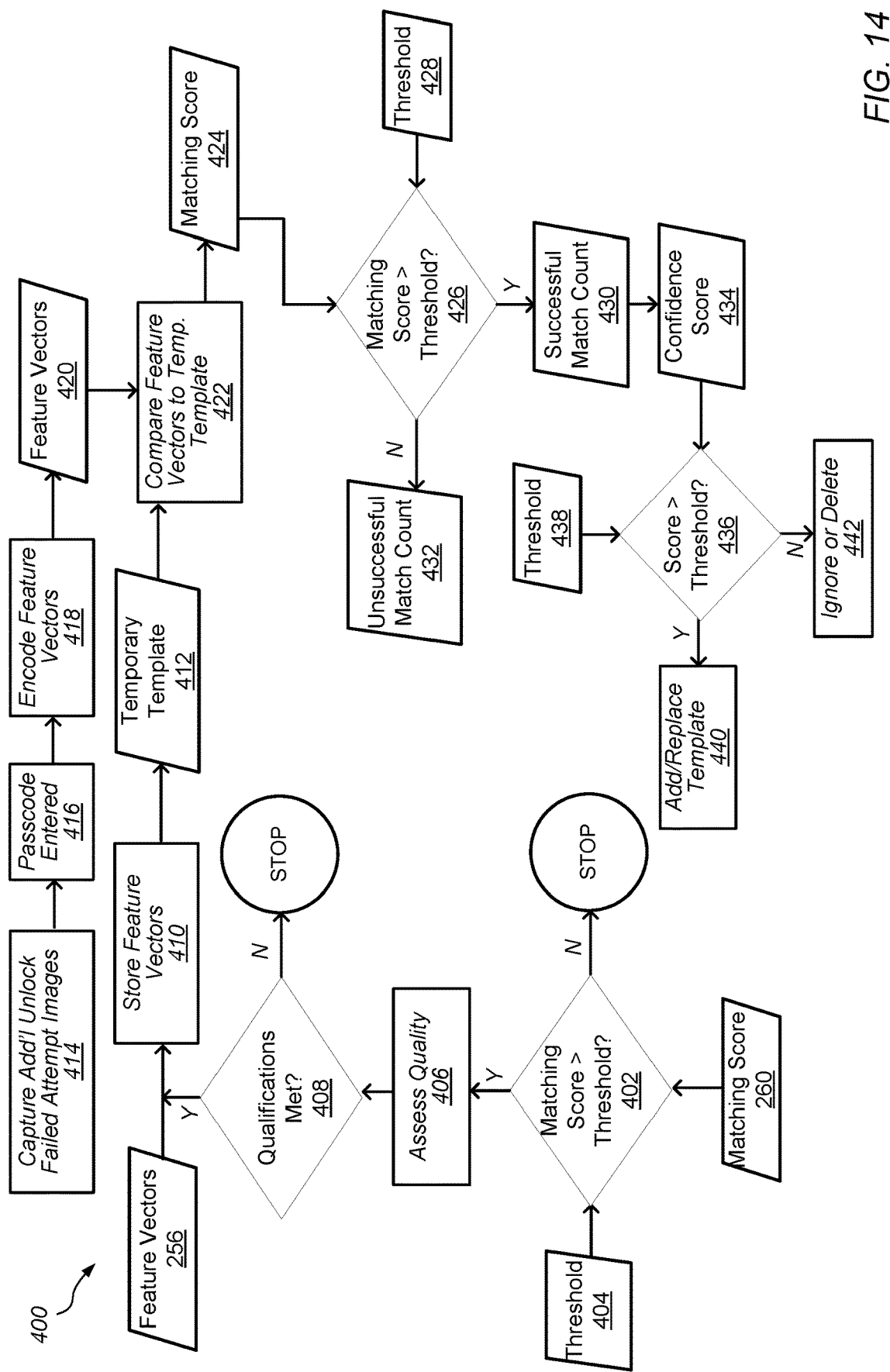
FIG. 14 depicts a flowchart of an additional embodiment of a template update process.

FIG. 14 depicts a flowchart of an embodiment of second template update process 400. Process 400 may be used when facial recognition authentication process 250 is unable to unlock device 100 but the device is unlocked using a passcode or other authentication protocol, as shown in FIG. 7. In some embodiments, process 400 may be used when device 100 is unlocked using the passcode immediately after the unlock attempt fails or within a specified time frame after the unlock attempt fails (e.g., in temporal proximity to the unlock attempt). In certain embodiments, process 400 is used to update template space 220 for a single enrollment profile (e.g., the enrollment profile used in process 250) on device 100. If multiple enrollment profiles are on device 100, process 400 may be operated on only the enrollment profile that is the closest match to the feature vectors from the captured unlock attempt image (as described herein).

In certain embodiments, process 400 is used to update template space 220 for the enrollment profile when facial features of the authorized user have changed to an extent that prevents feature vectors generated from an unlock attempt image (e.g., feature vectors 256) from being close enough (e.g., within the unlock threshold distance) to static templates 216 and/or dynamic templates 226 to allow device 100 to be unlocked using facial recognition authentication process 250, shown in FIG. 7. For example, process 400 may be used for feature vector 256B, which is depicted outside circle 265 (the unlock threshold circle) in FIG. 5. Possible causes for the user to be able to unlock device 100 using facial recognition authentication process 250 include, but are not limited to, if the authorized user shaves a beard or mustache, gets a large scar or other disfigurement to the face, large changes in makeup, drastic hair change, or has another severe change in a facial feature, these changes may be immediate changes or "step changes" in the facial features of the authorized user that do not allow first template update process 300 to update template space 220 gradually over time.

Second template update process 400 may begin by assessing in 402 if matching score 260 is above threshold 404. Threshold 404 may be a threshold score for determining if feature vector(s) 256 are similar (e.g., close) enough to feature vectors 210 (from static templates 216) that feature vector(s) 256 may potentially be used as another template. In certain embodiments, threshold 404 for process 400 is below unlock threshold 264. Threshold 404 may be below unlock threshold 264 (e.g., more distance allowed between feature vectors and the templates) because the passcode (or other authentication) has been entered prior to beginning process 400. Thus, the threshold for feature vector(s) 256 becoming a template in process 400 may be less strict than the threshold for unlocking the device and the threshold for process 300, shown in FIG. 11. Threshold 404 may, however, be set at a value that sets a maximum allowable distance between feature vectors 256 for the unlock attempt image and feature vectors for template space 220. Setting the maximum allowable distance may be used to prevent a user that is not the authorized user but has the passcode for device 100 to be enabled for facial recognition authentication on the device. Threshold 404 may be set during manufacturing and/or by the firmware of device 100. Threshold 404 may be updated (e.g., adjusted) by device 100 during operation of the device as described herein (e.g., after templates are added or replaced in template space 220).

Process 404 may be stopped and feature vector(s) 256 are deleted from device 100 if matching score 260 is below threshold 404. If matching score 260 is above threshold 404, then process 400 is continued. In some embodiments, after assessing 404, one or more qualities in the unlock attempt image are assessed in 406. For example, pose (e.g., pitch, yaw, and roll of the face), occlusion, attention, field of view, and/or distance in the unlock attempt image may be assessed in 406. In some embodiments, pose and/or occlusion in the unlock attempt image are assessed using the landmark and/or occlusion maps described herein. In 408, if suitable qualifications (as described above) are not met, then process 400 may be stopped.

If suitable qualifications are met in 408, then process 400 continues in 410 with storing feature vector(s) 256 in a backup space in the memory of device 100. The backup space in the memory for process 400 may be a different backup space than used for process 300. For example, the backup space in the memory for process 400 may be a temporary space in the memory that includes readable/writable memory partitioned from backup space used for process 300. Feature vector(s) 256 may be stored in the memory as temporary template 412.

In certain embodiments, after temporary template 412 is stored in the backup space, temporary template 412 may be compared to feature vectors for additional images from failed facial recognition authentication unlock attempts of device 100. For example, in process 400 additional unlock failed attempt images may be captured in 414. If the correct passcode is entered in 416, then feature vectors for the images captured in 414 may be encoded in 418 to generate feature vectors 420.

In certain embodiments, in 422, feature vectors 420 are compared to the feature vector(s) for temporary template 412. Comparison of feature vectors 420 and the feature vector(s) for temporary template 412 may provide matching score 424. Matching score 424 may be compared in 426 to threshold 428. Threshold 428 may be, for example, a similarity threshold or a threshold that defines at least a minimum level of matching between the feature vector(s) for temporary template 412 and feature vectors 420 obtained from the additional images from failed facial recognition authentication attempts that are followed by entering of the passcode for device 100. Thus, threshold 428 may be set at a value that ensures at least a minimum amount of probability that the change in the user's features that caused the failed unlock attempt and generated temporary template 412 is still present in the images from additional failed unlock attempts using facial recognition authentication.

If matching score 424 is above threshold 428 in 426, then a successful match is counted in 430. If matching score 424 is below threshold 428 in 426, then an unsuccessful match is counted in 432. Counts 430 and 432 may be continued until a desired number of failed unlock attempts are made using facial recognition authentication (e.g., a desired number of comparisons of matching score 424 and threshold 428). Once the desired number of attempts is made, the number of successful matches in 430 out of the total number of failed unlock attempts (e.g., the sum of counts 430 and 432) may be used to assess confidence score 434 for temporary template 412. For example, there may be 18 successful matches (e.g., comparisons) of matching score 424 and threshold 428 out of 20 total failed unlock attempts. Confidence score 434 may be used to assess whether or not template 412 is added as dynamic template 226 to template space 220 for the enrollment profile, shown in FIG. 6.

In some embodiments, it may be assumed that if a step change occurs in the facial features of the authorized user, the step change may remain for a number of successive unlock attempts using facial recognition authentication. For example, if the user shaved a beard, then the step change should remain for at least some length of time (e.g., at least a week). In such embodiments, if a successful unlock attempt (or a desired number of successful unlock attempts) using facial recognition authentication occurs before a selected number of successive unlock attempts is reached (e.g., 10 or 15 unlock attempts), then temporary template 412 may be deleted from the backup space in the memory. In some embodiments, the assumption that the step change may remain for a number of successive unlock attempts may not apply (e.g., if the user's step change was due to temporary application of makeup).

In certain embodiments, in 436, confidence score 434 is compared against threshold 438 to assess if the confidence score is greater than the threshold. Threshold 438 may be a threshold selected to ensure a minimum number of successful comparisons of matching score 424 and threshold 428 are reached before allowing template 412 to be added to template space 220. In 436, if confidence score 434 is greater than threshold 438, then, in 440, temporary template 412 may be added to template space 220 or temporary template 412 may replace a template in the template space 220 (e.g., replace one of dynamic templates 226). If confidence score 434 is less than threshold 438, then temporary template 412 may be ignored or deleted in 442.

As described above, temporary template 412 generated by process 400 may be added to dynamic portion 224 of template space 220 for the enrollment profile as one of dynamic templates 226, shown in FIG. 6. For process 400, shown in FIG. 14, the passcode (or other authentication) has been used to verify that temporary template 412 is for the authorized user. Thus, in certain embodiments, temporary template 412 is added to template space 220 in 440 without a need for comparison to dynamic templates 226 already in dynamic portion 224. If the maximum number of allowed dynamic templates 226 in dynamic portion 224 has not been reached, then temporary template 412 is added to the dynamic portion as one of dynamic templates 226.

If the maximum number of allowed dynamic templates 226 in dynamic portion 224 has been reached, then temporary template 412 may replace one of dynamic templates 226 in the dynamic portion. As the passcode (or other authentication) has been used to verify temporary template 412 is for the authorized user, the temporary template may replace one of dynamic templates 226 in dynamic portion 224 even if the temporary template is more of an outlier than each of dynamic templates 226. In certain embodiments, temporary template 412 replaces the largest outlier of dynamic templates 226 regardless of the relative lie (e.g., outlie) of the temporary template. In some embodiments, temporary template 412 may replace a dynamic template that is redundant (e.g., most redundant) to the existing dynamic templates even if the temporary template is more of an outlier than each of the dynamic templates.

Figure 15:
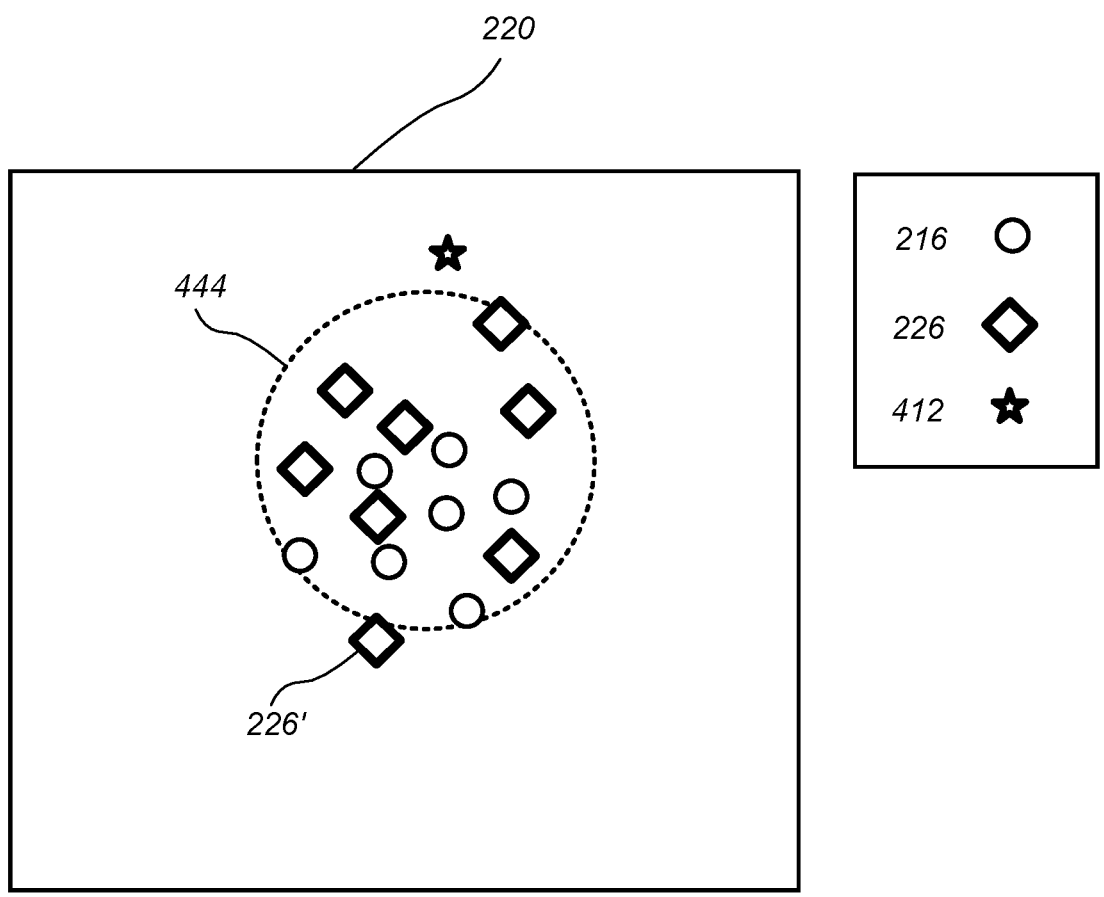
FIG. 15 depicts a representation of an additional embodiment of a template space represented as a feature space.

FIG. 15 depicts a representation of an embodiment of template space 220 represented as a feature space with a feature vector for temporary template 412. In the feature space depiction of template space 220 in FIG. 15, static templates 216, dynamic templates 226, and temporary template 412 are represented by feature vectors. Static templates 216 are represented by circles, dynamic templates 226 are represented by diamonds, and temporary template 412 is represented by a star. As described above, static templates 216 may not be replaced by temporary template 412. Thus, if dynamic portion 224 has reached its maximum number of dynamic templates 226, temporary template 412 may replace one of dynamic templates 226.

Statistical analysis of the feature vectors in the feature space correlating to template space 220 may generate a circle (e.g., circle 444) that most closely defines a maximum number of the feature vectors. As shown in FIG. 15, the feature vector for dynamic template 226' is the largest outlier of each of the feature vectors for dynamic templates 226. Thus, temporary template 412 may replace dynamic template 226' in template space 220 regardless of the position of the feature vector for the temporary template. In the example depicted in FIG. 15, the addition of the feature vector for temporary template 412 shifts circle 444 towards the feature vector for temporary template 412 and may cause the feature vector for dynamic template 226' to become the largest outlier of the circle. In some embodiments, when temporary template 412 replaces dynamic template 226' in template space 220, one or more thresholds for device 100 may be recalculated.

In some embodiments, a temporary template (e.g., either temporary template 312 or temporary template 412) may be used to unlock device 100 for a selected period of time while the temporary template is in the backup space of the memory (e.g., before the temporary template is added to template space 220). The temporary template may be used to unlock device 100 after the passcode (or other user authentication protocol) is used in combination with the temporary template. For example, for temporary template 412, the passcode has been entered to unlock device 100 before temporary template 412 is generated and stored in the backup space of the device memory. Temporary template 412 may then be used to allow unlocking of device 100 using facial recognition authentication for a selected time period (e.g., a few days or a week). After the selected time period expires, if temporary template 412 has not been added to template space 220, the user may be prompted for the passcode if facial recognition authentication of the user fails.

In certain embodiments, one or more process steps described herein may be performed by one or more processors (e.g., a computer processor) executing instructions stored on a non-transitory computer-readable medium. For example, process 200, process 250, process 300, process 400, and process 700, shown in FIGS. 4, 7, 8, 11, and 14, may have one or more steps performed by one or more processors executing instructions stored as program instructions in a computer readable storage medium (e.g., a non-transitory computer readable storage medium).

Figure 16:
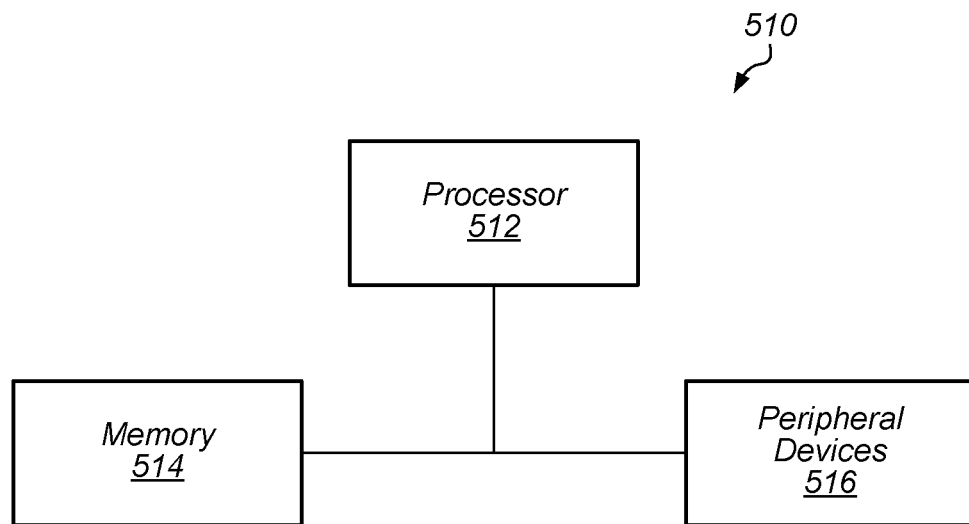
FIG. 16 depicts a block diagram of one embodiment of an exemplary computer system.

FIG. 16 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, process 250, process 300, and process 400, and process 700, shown in FIGS. 4, 7, 8, 11, and 14. In the embodiment of FIG. 16, computer system 510 includes processor 512, memory 514, and various peripheral devices 516. Processor 512 is coupled to memory 514 and peripheral devices 516. Processor 512 is configured to execute instructions, including the instructions for process 200, process 250, process 300, process 400, and/or process 700, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 17:
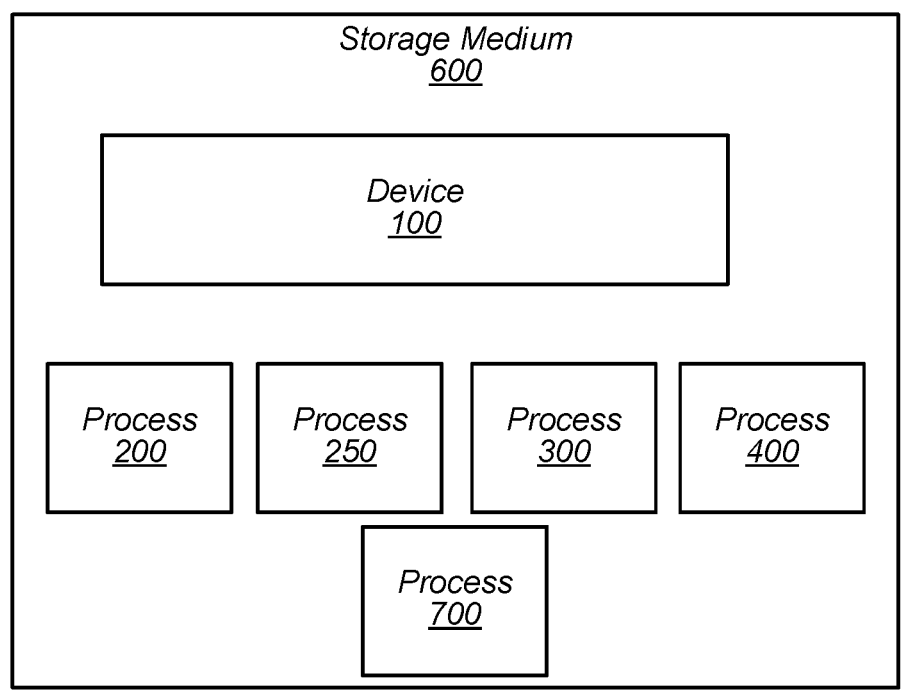
FIG. 17 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 17, other input/output (I/O) devices such as video hardware, audio hardware, user interface devices, networking hardware, etc.).

Turning now to FIG. 17, a block diagram of one embodiment of computer accessible storage medium 600 including one or more data structures representative of device 100 (depicted in FIG. 1) included in an integrated circuit design and one or more code sequences representative of process 200, process 250, process 300, process 400, and/or process 700 (shown in FIGS. 4, 7, 8, 11, and 14). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

As described herein, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
   obtaining a plurality of images of a face of a user using a camera located on a device, the device comprising a computer processor and a memory, wherein the plurality of images is obtained for user authentication attempts on the device using a facial recognition authentication process;
   for each obtained image:
      encoding the image to generate at least one feature vector for the image, wherein the at least one feature vector represents one or more facial features of the user in the image;
      comparing the at least one feature vector to one or more reference templates stored in the memory of the device to obtain a matching score for the at least one feature vector;

storing the at least one feature vector as a temporary template in the memory of the device when the matching score for the at least one feature vector is above a threshold;

after a selected number of temporary templates are stored in the memory of the device, selecting one of the temporary templates based on an assessment of the temporary templates;

obtaining a plurality of additional images for additional user authentication attempts of the device using the facial recognition authentication process, assessing, using the plurality of additional images, a performance of the reference templates in the facial recognition authentication process during the additional user authentication attempts of the device;

assessing, using the plurality of additional images, a performance of the selected temporary template in an additional facial recognition authentication process during the additional user authentication attempts of the device, comparing the performance of the reference templates and the performance of the selected temporary template during the additional user authentication attempts of the device; and adding the selected temporary template to the reference templates in response to the performance of the selected temporary template being higher than at least one of the reference templates during the additional user authentication attempts of the device.

2. The method of claim 1, wherein selecting the temporary template comprises selecting a median temporary template from the temporary templates.

3. The method of claim 1, wherein selecting the temporary template comprises assessing one or more clusters of the temporary templates in a feature space and selecting a median temporary template in a cluster of temporary templates.

4. The method of claim 1, wherein the threshold for storing the feature vector as the temporary template is an unlock threshold for the device.

5. The method of claim 1, wherein the selected temporary template replaces one of the reference templates when the performance of the selected temporary template is higher than at least one of the reference templates.

6. The method of claim 1, wherein the selected temporary template replaces all the reference templates when the performance of the selected temporary template is higher than each of the reference templates.

7. The method of claim 1, wherein the reference templates are generated by:
obtaining a plurality of reference images of the face of the user using the camera;
selecting reference images for encoding based on the selected reference images meeting selected criteria for the reference images;
encoding a plurality of facial features of the user from the selected reference images to generate the plurality of reference feature vectors; and
storing the plurality of reference feature vectors as the reference templates in the memory of the device.

8. The method of claim 1, wherein the additional facial recognition authentication process operates alongside the facial recognition authentication process with the selected temporary template replacing the reference templates in the additional facial recognition authentication process.

9. A device, comprising:
a computer processor;
a memory;
a camera;
at least one illuminator providing infrared illumination;
circuitry coupled to the camera and the illuminator, wherein the circuitry is configured to:
obtain a plurality of images of a face of a user using the camera, wherein the plurality of images is obtained for user authentication attempts on the device using a facial recognition authentication process;
for each obtained image:
encode the image to generate at least one feature vector for the image, wherein the at least one feature vector represents one or more facial features of the user in the image;
compare the at least one feature vector to one or more reference templates stored in the memory of the device to obtain a matching score for the at least one feature vector;
store the at least one feature vector as a temporary template in the memory of the device when the matching score for the at least one feature vector is above a threshold;
after a selected number of temporary templates are stored in the memory of the device, select one of the temporary templates based on an assessment of the temporary templates;
obtain a plurality of additional images for additional user authentication attempts of the device using the facial recognition authentication process;
assess, using the plurality of additional images, a performance of the reference templates in the facial recognition authentication process during the additional user authentication attempts of the device;
assess, using the plurality of additional images, a performance of the selected temporary template in an additional facial recognition authentication process during the additional user authentication attempts of the device;
compare the performance of the reference templates and the performance of the selected temporary template during the additional user authentication attempts of the device; and
add the selected temporary template to the reference templates in response to the performance of the selected temporary template being higher than at least one of the reference templates during the additional user authentication attempts of the device.

10. The device of claim 9, wherein the camera comprises an infrared sensor.

11. The device of claim 9, wherein the at least one illuminator comprises a flood infrared illuminator and a pattern infrared illuminator.

12. The device of claim 9, wherein the circuitry is configured to perform an enrollment process to generate the reference templates.

13. The device of claim 12, wherein the circuitry is, in generating the reference templates, configured to:
obtain a plurality of reference images of the face of the user using the camera;
select reference images for encoding based on the selected reference images meeting selected criteria for the reference images;
encode a plurality of facial features of the user from the selected reference images to generate the plurality of reference feature vectors; and
store the plurality of reference feature vectors as the reference templates in the memory of the device.

14. The device of claim 9, wherein the circuitry is configured to select the temporary template by selecting a median temporary template from the temporary templates.

15. The device of claim 9, wherein the circuitry is configured to select the temporary template by assessing one or more clusters of the temporary templates in a feature space and selecting a median temporary template in a cluster of temporary templates.

16. The device of claim 9, wherein the facial recognition authentication process is operated to authenticate the user as an authorized user of the device.

17. A non-transient computer-readable medium including instructions that, when executed by one or more processors, cause the one or more processors to perform a method, comprising, comprising:
    obtaining a plurality of images of a face of a user using a camera located on a device, the device comprising a computer processor and a memory, wherein the plurality of images is obtained for user authentication attempts on the device using a facial recognition authentication process;
    for each obtained image:
        encoding the image to generate at least one feature vector for the image, wherein the at least one feature vector represents one or more facial features of the user in the image;
        comparing the at least one feature vector to one or more reference templates stored in the memory of the device to obtain a matching score for the at least one feature vector;
        storing the at least one feature vector as a temporary template in the memory of the device when the matching score for the at least one feature vector is above a threshold;
    after a selected number of temporary templates are stored in the memory of the device, selecting one of the temporary templates based on an assessment of the temporary templates;
    obtaining a plurality of additional images for additional user authentication attempts of the device using the facial recognition authentication process;
    assessing, using the plurality of additional images, a performance of the reference templates in the facial recognition authentication process during the additional user authentication attempts of the device;
    assessing, using the plurality of additional images, a performance of the selected temporary template in an additional facial recognition authentication process during the additional user authentication attempts of the device,
    comparing the performance of the reference templates and the performance of the selected temporary template during the additional user authentication attempts of the device; and
    adding the selected temporary template to the reference templates in response to the performance of the selected temporary template being higher than at least one of the reference templates during the additional user authentication attempts of the device.

18. The non-transient computer-readable medium of claim 17, wherein the facial recognition authentication process comprises:
    obtaining at least one user authentication attempt image of the user using the camera located on the device;
    encoding the at least one user authentication attempt image to generate at least one user authentication attempt feature vector, wherein the user authentication attempt feature vector represents one or more facial features of the user in the at least one user authentication attempt image;
    comparing the at least one user authentication attempt feature vector to the reference templates to obtain a first matching score;
    comparing the at least one user authentication attempt feature vector to the selected temporary template to obtain a second matching score; and
    authorizing the user to perform at least one operation on the device that requires authentication when either the first matching score or the second matching score is above an unlock threshold.

19. The non-transient computer-readable medium of claim 17, wherein the images are infrared images of the face of the user.

20. The non-transient computer-readable medium of claim 17, wherein assessing the performance of the reference templates and the performance of the selected temporary template comprises assessing acceptance rates and rejection rates of the plurality of additional images obtained during the additional user authentication attempts of the device.

* * * * *